(12) United States Patent
Bae et al.

(10) Patent No.: US 10,326,315 B2
(45) Date of Patent: Jun. 18, 2019

(54) WIRELESS POWER TRANSMISSION APPARATUS

(71) Applicant: LG INNOTEK CO., LTD., Seoul (KR)

(72) Inventors: Su Ho Bae, Seoul (KR); Yu Ri Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 152 days.

(21) Appl. No.: 15/534,899

(22) PCT Filed: Oct. 5, 2015

(86) PCT No.: PCT/KR2015/010519
§ 371 (c)(1),
(2) Date: Jun. 9, 2017

(87) PCT Pub. No.: WO2016/093478
PCT Pub. Date: Jun. 16, 2016

(65) Prior Publication Data
US 2017/0338696 A1    Nov. 23, 2017

(30) Foreign Application Priority Data

Dec. 10, 2014   (KR) .................. 10-2014-0177607
Dec. 10, 2014   (KR) .................. 10-2014-0177608

(51) Int. Cl.
*H02J 50/00* (2016.01)
*H02J 50/12* (2016.01)
(Continued)

(52) U.S. Cl.
CPC ............... *H02J 50/12* (2016.02); *H02J 7/00* (2013.01); *H02J 7/0068* (2013.01); *H02J 7/025* (2013.01);
(Continued)

(58) Field of Classification Search
CPC ............ H02J 50/12; H02J 50/00; H02J 50/50; H02J 50/70; H02J 7/00; H02J 7/0068; H02J 7/025
(Continued)

(56) References Cited

U.S. PATENT DOCUMENTS

2011/0133569 A1   6/2011   Cheon et al.
2014/0167520 A1   6/2014   Moh et al.
(Continued)

FOREIGN PATENT DOCUMENTS

KR   10-2012-0044842 A   5/2012
KR   10-2013-0025935 A   3/2013
(Continued)

*Primary Examiner* — Hal Kaplan
(74) *Attorney, Agent, or Firm* — Birch, Stewart, Kolasch & Birch, LLP

(57) ABSTRACT

A wireless power transmission apparatus according to an embodiment of the present invention includes a resonance-type coil unit, an induction-type coil unit, and a loss suppression unit including a serial resonant circuit connected to both ends of the induction-type coil unit, wherein the loss suppression unit resonates at a first frequency for driving the resonance-type coil unit. A wireless power transmission apparatus according to another embodiment of the present invention includes a resonance-type coil unit, an induction-type coil unit, and a switch element connected to both ends of the induction-type coil unit, wherein the switch element is turned on or off when power is transmitted by either of the resonance-type coil unit or the induction-type coil unit.

20 Claims, 16 Drawing Sheets

(51) Int. Cl.
  *H02J 50/50* (2016.01)
  *H02J 50/70* (2016.01)
  *H02J 7/00* (2006.01)
  *H02J 7/02* (2016.01)
(52) U.S. Cl.
  CPC .............. *H02J 50/00* (2016.02); *H02J 50/50* (2016.02); *H02J 50/70* (2016.02)
(58) Field of Classification Search
  USPC ........................................................ 307/104
  See application file for complete search history.

(56) References Cited

U.S. PATENT DOCUMENTS

| | | |
|---|---|---|
| 2014/0191593 A1 | 7/2014 | Moh |
| 2015/0372497 A1 | 12/2015 | Bae |

FOREIGN PATENT DOCUMENTS

| | | |
|---|---|---|
| KR | 10-2013-0045167 A | 5/2013 |
| KR | 10-2014-0077591 A | 6/2014 |
| KR | 10-2014-0089187 A | 7/2014 |
| KR | 10-2014-0096879 A | 8/2014 |

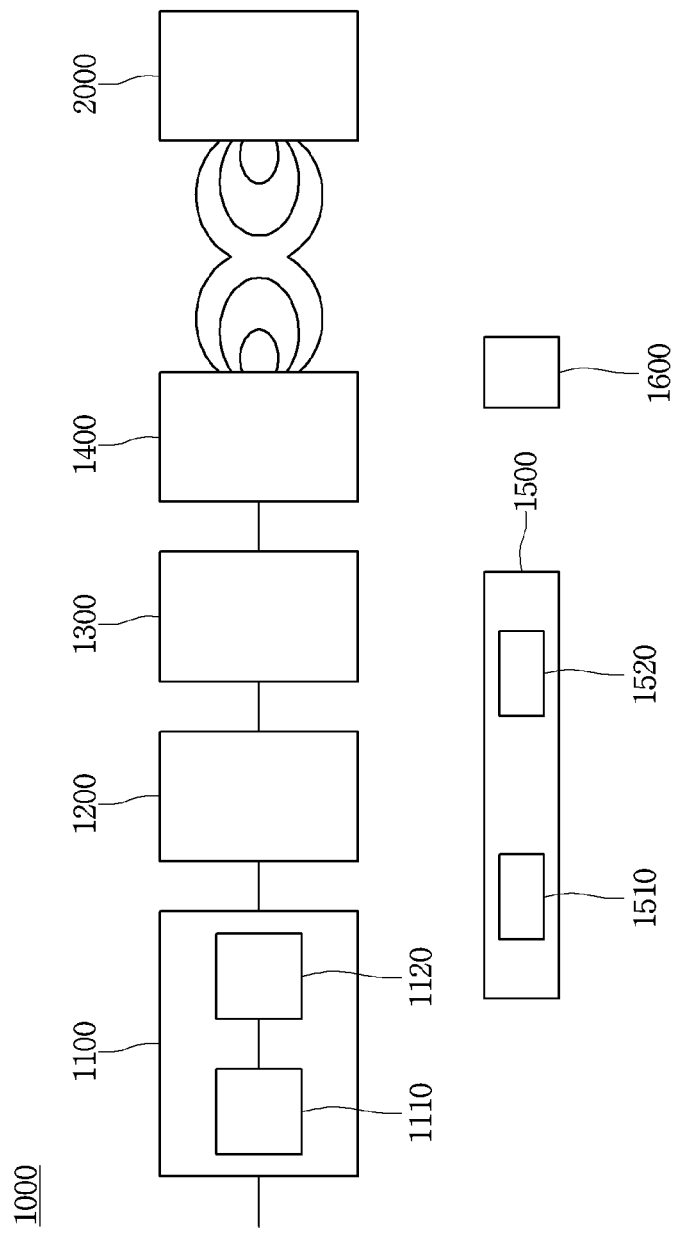

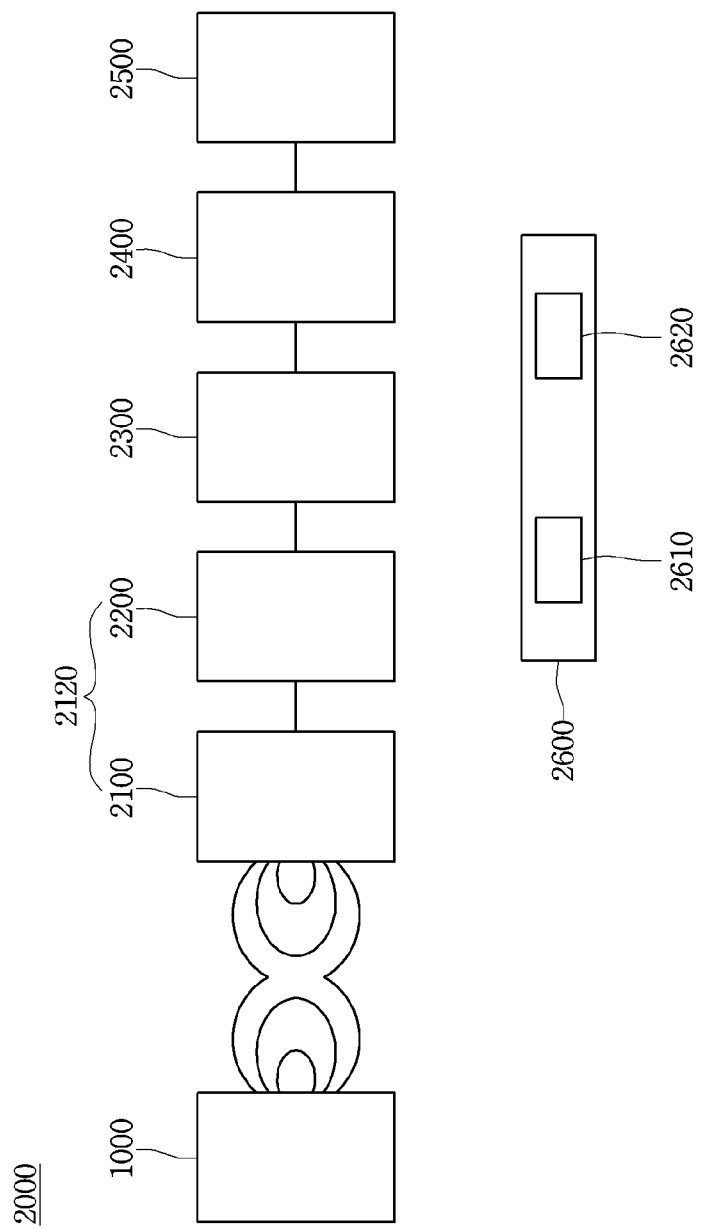

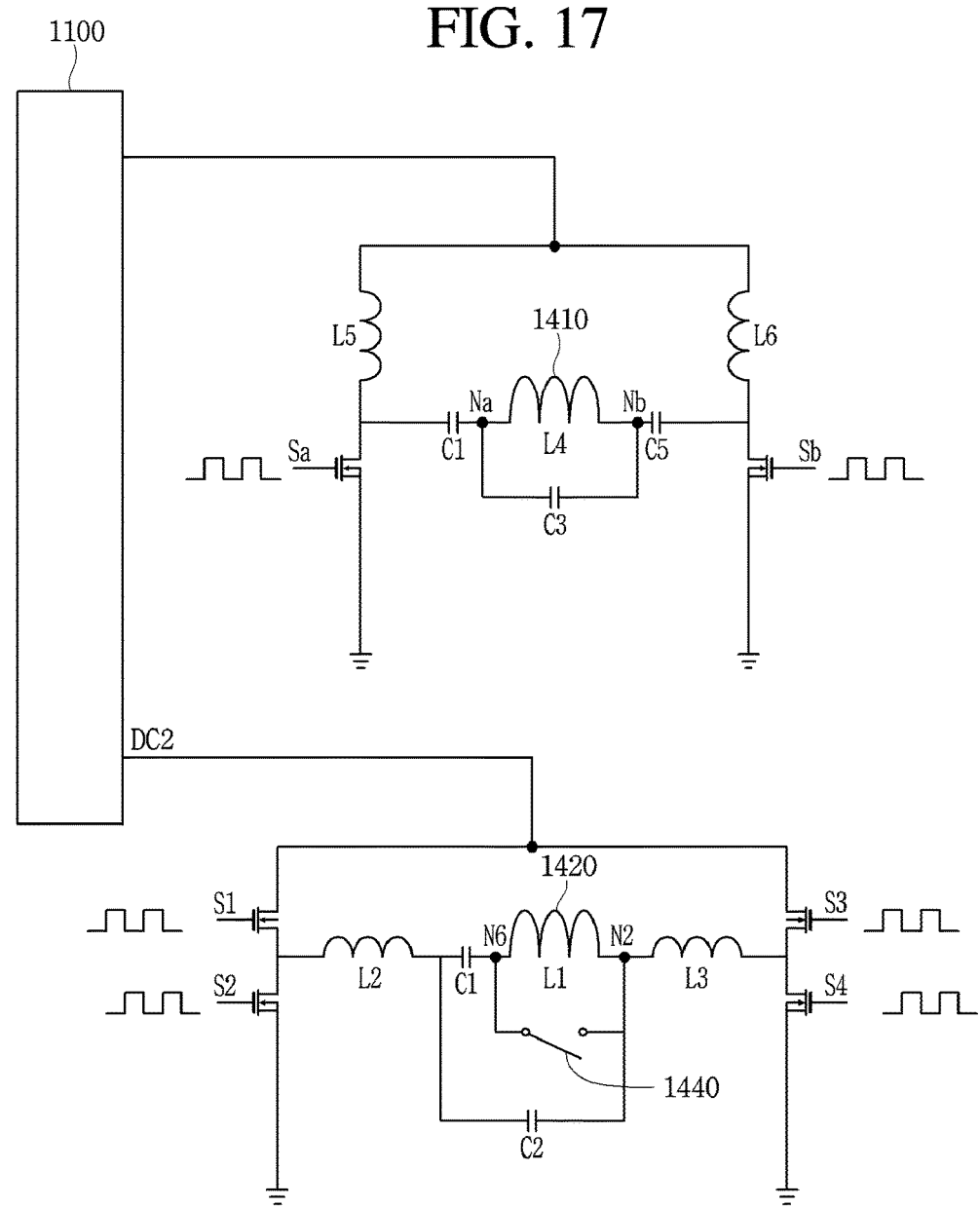

WIRELESS POWER TRANSMISSION APPARATUS

CROSS REFERENCE TO RELATED APPLICATIONS

This application is the National Phase of PCT International Application No. PCT/KR2015/010519, filed on Oct. 5, 2015, which claims priority under 35 U.S.C. 119(a) to Patent Application Nos. 10-2014-0177607, filed in the Republic of Korea on Dec. 10, 2014 and No. 10-2014-0177608, filed in the Republic of Korea on Dec. 10, 2014, all of which are hereby expressly incorporated by reference into the present application.

TECHNICAL FIELD

The present invention relates to a wireless power transmission system, and more particularly, to a wireless power transmission apparatus.

BACKGROUND ART

With rapid development of information communication technology in recent years, we are moving toward a ubiquitous society based on the information communication technology. In order to access information communication devices anytime anywhere, it is necessary to install sensors each having a computer chip capable of performing a communication function in all social facilities. Consequently, the supply of power to the devices or sensors is a new issue. In addition, as kinds of portable devices, such as a mobile phone, a Bluetooth headset, and an iPod music player, have been increased, it takes time and efforts for users to charge batteries. In recent years, wireless power transmission technology has attracted attention as a method of solving this problem.

Wireless power transmission or wireless energy transfer refers to a technology of wirelessly transferring electric energy from a transmitter to a receiver by using the principle of magnetic induction. In the 1800's, an electric motor or a transformer using the principle of electromagnetic induction had been used, and afterward, a method of transferring electric energy by emitting electromagnetic waves, such as radio waves or lasers, has been attempted. Actually, electrical toothbrushes or electrical razors, which are frequently used in daily life, are charged based on the principle of electromagnetic induction.

Wireless energy transfer schemes used until now may be divided into a magnetic induction scheme, an electromagnetic resonance scheme, and a power transmission scheme using a short-wavelength radio frequency.

The magnetic induction scheme is a technology using phenomenon in which when two coils are disposed adjacent to each other and current is supplied to one of the two coils, a magnetic flux is, generated and, as a result, electromotive force is generated in the other coil. The magnetic induction scheme is being rapidly commercialized for small-sized devices, such as mobile phones. The magnetic induction scheme has an advantage in that it is possible to transfer power of a maximum of a few hundreds of kilowatts (kW) with high efficiency. However; the magnetic induction scheme has a disadvantage in that the maximum transfer distance is 1 centimeter (cm) or less and thus coils must be disposed adjacent to a charger or the bottom of a mobile phone.

The electromagnetic resonance scheme is characterized by using an electric field or a magnetic field instead of utilizing an electromagnetic wave or current. The electromagnetic resonance scheme has an advantage in that the electromagnetic resonance scheme is not affected by the electromagnetic wave and is thus safe for other electronic devices and human bodies. However, the electromagnetic resonance scheme has a disadvantage in that the electromagnetic resonance scheme is utilized within a limited distance and space and energy transfer efficiency is somewhat low.

The short-wavelength wireless power transmission scheme, simply an RF scheme, utilizes that energy can be directly transmitted and received in a radio wave form. This technology is an RF wireless power transmission scheme using a rectenna. Rectenna, which is a compound word of an antenna and a rectifier, refers to an element for directly converting RF power into DC power. That is, the RF scheme is a technology of converting an AC radio wave into DC. In recent years, research has been actively conducted on commercialization of the RF scheme with improvement in efficiency of the RF scheme.

Wireless power transmission may be variously utilized in various industries, such as IT, railway, and electric home appliance industries as well as a mobile industry.

In recent years, a transmission apparatus, to which the magnetic induction scheme and the electromagnetic resonance scheme are compositely applied, has been actively developed. This is because power can be supplied to a reception apparatus, regardless of a type of a power supply scheme of the reception apparatus.

However, in a case where the magnetic induction scheme and the electromagnetic resonance scheme are used together, power loss is generated by a coupling phenomenon caused by a magnetic flux between a coil for magnetic induction and a coil for electromagnetic resonance upon supply of power by using any one of the schemes, resulting in a reduction in power efficiency.

DISCLOSURE OF THE INVENTION

Technical Problem

Embodiments of the present invention may provide a wireless power transmission apparatus including a loss suppression unit for preventing power loss caused by a coupling phenomenon in a coil for magnetic induction due to a magnetic flux generated from a coil for electromagnetic resonance when operating in an electromagnetic resonance scheme.

Embodiments of the present invention may also provide a wireless power transmission apparatus capable of minimizing influence of a loss suppression unit on a magnetic induction operation when operating in an electromagnetic resonance scheme.

Embodiments of the present invention may also provide a wireless power transmission apparatus capable of minimizing influence of a switch unit on a magnetic induction operation when operating in an electromagnetic resonance scheme.

Technical Solution

A wireless power transmission apparatus according to an embodiment of the present invention may include: a resonance-type coil unit; an induction-type coil unit; and a loss suppression unit including a serial resonant circuit connected to both ends of the induction-type coil unit, wherein the loss suppression unit resonates at a first frequency for driving the resonance-type coil unit.

In a wireless power transmission apparatus according to another embodiment of the present invention, the serial resonant circuit may include at least one capacitor and at least one inductor.

A wireless power transmission apparatus according to further another embodiment of the present invention may include a loss suppression capacitor and a loss suppression inductor connected in series to the loss suppression capacitor.

In a wireless power transmission apparatus according to further another embodiment of the present invention, the loss suppression unit may have an impedance magnitude equal to or greater than an impedance magnitude preset at a second frequency for driving the induction-type coil unit.

A wireless power transmission apparatus according to further another embodiment of the present invention may further include: a first DC/AC conversion unit configured to convert a first DC signal and transfer an AC signal having the first frequency to the resonance-type coil unit; and a second DC/AC conversion unit configured to convert a second DC signal and transfer an AC signal having the second frequency to the induction-type coil unit.

A wireless power transmission apparatus according to further another embodiment of the present invention may further include a control unit configured to control operations of the first and second DC/AC conversion units, wherein the control unit enables the first DC/AC conversion unit and disables the second DC/AC conversion unit so that the first DC/AC conversion unit is controlled to transfer the AC signal having the first frequency to the resonance-type coil unit.

A wireless power transmission apparatus according to further another embodiment of the present invention may further include a control unit configured to control operations of the first and second DC/AC conversion units, wherein the control unit enables the second DC/AC conversion unit and disables the first DC/AC conversion unit so that the second DC/AC conversion unit is controlled to transfer the AC signal having the second frequency to the induction-type coil unit.

A wireless power transmission apparatus according to further another embodiment of the present invention may further include an AC/DC conversion unit configured to receive an AC signal and supply the first and second DC signals to the first and second DC/AC conversion units, wherein the first DC/AC conversion unit may include: a first high-frequency filter unit connected between the AC/DC conversion unit and a first node; a second high-frequency filter unit connected between the AC/DC conversion unit and a second node; a first switch connected between the first node and a third node; and a second switch connected between the second node and the third node, wherein the resonance-type coil unit is connected between the first node and the second node.

A wireless power transmission apparatus according to further another embodiment of the present invention may further include an AC/DC conversion unit configured to receive an AC signal and supply the first and second DC signals to the first and second DC/AC conversion units, wherein the second DC/AC conversion unit may include: a first switch connected between the AC/DC conversion unit and a first node; a second switch connected between the first node and a third node; a third switch connected between the AC/DC conversion unit and a second node; and a fourth switch connected between the second node and the third node, wherein the induction-type coil unit is connected between the first node and the second node.

A wireless power transmission apparatus according to further another embodiment of the present invention includes: a first coil unit; a second coil unit; and a loss suppression unit including a resonant circuit connected to both ends of the second coil unit, wherein the resonant circuit of the loss suppression unit resonates at a first frequency for driving the first coil unit.

In a wireless power transmission apparatus according to further another embodiment of the present invention, the resonant circuit may include at least one capacitor and at least one inductor.

In a wireless power transmission apparatus according to further another embodiment of the present invention, the resonant circuit may be a serial resonant circuit.

In a wireless power transmission apparatus according to further another embodiment of the present invention, the loss suppression unit may have an impedance magnitude equal to or greater than an impedance magnitude preset at a second frequency for driving the second coil unit.

In a wireless power transmission apparatus according to further another embodiment of the present invention, the first coil unit may include a resonance-type coil.

In a wireless power transmission apparatus according to further another embodiment of the present invention, the second coil unit may include an induction-type coil.

In a wireless power transmission apparatus according to further another embodiment of the present invention, the first frequency may be about 6.78 MHz.

In a wireless power transmission apparatus according to further another embodiment of the present invention, the second frequency may be about 125 MHz.

In a wireless power transmission apparatus according to further another embodiment of the present invention, the loss suppression unit may include a variable capacitor and a variable inductor connected in series to each other.

In a wireless power transmission apparatus according to further another embodiment of the present invention, when the first frequency is varied, at least one of a capacitance of the variable capacitor and an inductance of the variable inductor may be varied.

A wireless power transmission apparatus according to further another embodiment of the present invention may include: a first DC/AC conversion unit configured to convert a first DC signal and transfer an AC signal having the first frequency to the resonance-type coil unit; a second DC/AC conversion unit configured to convert a second DC signal and transfer an AC signal having the second frequency to the induction-type coil unit; and a control unit configured to control operations of the first and second DC/AC conversion units, wherein the control unit may enable one of the first and second DC/AC conversion units and disable the other thereof.

A wireless power transmission apparatus according to further another embodiment of the present invention may include: a resonance-type coil unit; an induction-type coil unit; and a loss suppression unit including a serial resonant circuit connected to both ends of the induction-type coil unit, wherein the loss suppression unit resonates at a first frequency for driving the resonance-type coil unit.

In a wireless power transmission apparatus according to further another embodiment of the present invention, the serial resonant circuit may include at least one capacitor and at least one inductor.

A wireless power transmission apparatus according to further another embodiment of the present invention may include a loss suppression capacitor and a loss suppression inductor connected in series to the loss suppression capacitor.

In a wireless power transmission apparatus according to further another embodiment of the present invention, the loss suppression unit may have an impedance magnitude equal to or greater than an impedance magnitude preset at a second frequency for driving the induction-type coil unit.

A wireless power transmission apparatus according to further another embodiment of the present invention may further include: a first DC/AC conversion unit configured to convert a first DC signal and transfer an AC signal having the first frequency to the resonance-type coil unit; and a second DC/AC conversion unit configured to convert a second DC signal and transfer an AC signal having the second frequency to the induction-type coil unit.

A wireless power transmission apparatus according to further another embodiment of the present invention may further include a control unit configured to control operations of the first and second DC/AC conversion units, wherein the control unit enables the first DC/AC conversion unit and disables the second DC/AC conversion unit so that the first DC/AC conversion unit is controlled to transfer the AC signal having the first frequency to the resonance-type coil unit.

A wireless power transmission apparatus according to further another embodiment of the present invention may further include a control unit configured to control operations of the first and second DC/AC conversion units, wherein the control unit enables the second DC/AC conversion unit and disables the first DC/AC conversion unit so that the second DC/AC conversion unit is controlled to transfer the AC signal having the second frequency to the induction-type coil unit.

A wireless power transmission apparatus according to further another embodiment of the present invention may further include an AC/DC conversion unit configured to receive an AC signal and supply the first and second DC signals to the first and second DC/AC conversion units, wherein the first DC/AC conversion unit may include: a first high-frequency filter unit connected between the AC/DC conversion unit and a first node; a second high-frequency filter unit connected between the AC/DC conversion unit and a second node; a first switch connected between the first node and a third node; and a second switch connected between the second node and the third node, wherein the resonance-type coil unit is connected between the first node and the second node.

A wireless power transmission apparatus according to further another embodiment of the present invention may further include an AC/DC conversion unit configured to receive an AC signal and supply the first and second DC signals to the first and second DC/AC conversion units, wherein the second DC/AC conversion unit may include: a first switch connected between the AC/DC conversion unit and a first node; a second switch connected between the first node and a third node; a third switch connected between the AC/DC conversion unit and a second node; and a fourth switch connected between the second node and the third node, wherein the induction-type coil unit is connected between the first node and the second node.

A wireless power transmission apparatus according to further another embodiment of the present invention includes: a first coil unit; a second coil unit; and a loss suppression unit including a resonant circuit connected to both ends of the second coil unit, wherein the resonant circuit of the loss suppression unit resonates at a first frequency for driving the first coil unit.

In a wireless power transmission apparatus according to further another embodiment of the present invention, the resonant circuit may include at least one capacitor and at least one inductor.

In a wireless power transmission apparatus according to further another embodiment of the present invention, the resonant circuit may be a serial resonant circuit.

In a wireless power transmission apparatus according to further another embodiment of the present invention, the loss suppression unit may have an impedance magnitude equal to or greater than an impedance magnitude preset at a second frequency for driving the second coil unit.

In a wireless power transmission apparatus according to further another embodiment of the present invention, the first coil unit may include a resonance-type coil.

In a wireless power transmission apparatus according to further another embodiment of the present invention, the second coil unit may include an induction-type coil.

In a wireless power transmission apparatus according to further another embodiment of the present invention, the first frequency may be about 6.78 MHz.

In a wireless power transmission apparatus according to further another embodiment of the present invention, the second frequency may be about 125 MHz.

In a wireless power transmission apparatus according to further another embodiment of the present invention, the loss suppression unit may include a variable capacitor and a variable inductor connected in series to each other.

In a wireless power transmission apparatus according to further another embodiment of the present invention, when the first frequency is varied, at least one of a capacitance of the variable capacitor and an inductance of the variable inductor may be varied.

A wireless power transmission apparatus according to further another embodiment of the present invention may include: a first DC/AC conversion unit configured to convert a first DC signal and transfer an AC signal having the first frequency to the resonance-type coil unit; a second DC/AC conversion unit configured to convert a second DC signal and transfer an AC signal having the second frequency to the induction-type coil unit; and a control unit configured to control operations of the first and second DC/AC conversion units, wherein the control unit may enable one of the first and second DC/AC conversion units and disable the other thereof.

BRIEF DESCRIPTION OF THE DRAWINGS

FIGS. 3a and 3b are block diagrams illustrating a wireless power transfer system-charger that is one of sub-systems constituting a wireless power transmission system.

FIGS. 4a and 4b are block diagrams illustrating a wireless power receiver system-device that is one of sub-systems constituting a wireless power transmission system.

FIG. 17 is a view illustrating an equivalent circuit when the wireless power transfer system-charger according to an embodiment of the present invention supplies power at the second frequency in the magnetic induction scheme.

MODE FOR CARRYING OUT THE INVENTION

Figure 1:
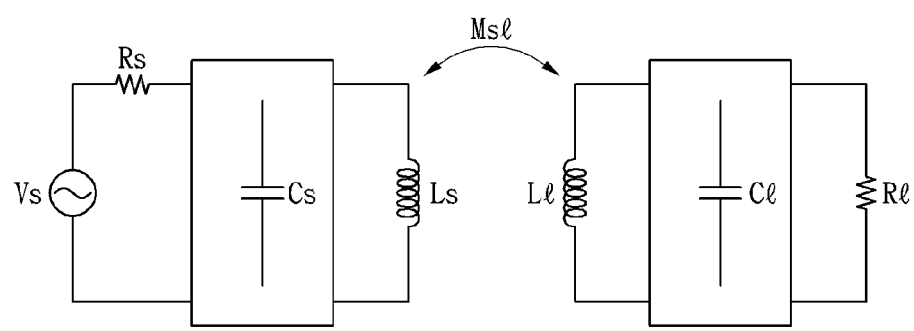
FIG. 1 is an equivalent circuit diagram of a magnetic induction scheme.

Hereinafter, wireless power transmission apparatuses according to embodiments of the present invention will be described in detail with reference to the accompanying drawings. These embodiments are provided so that this disclosure will be thorough and complete, and will fully convey the scope of the invention to those skilled in the art. The invention may, however, be embodied in many different forms and should not be construed as being limited to the embodiments set forth herein. In the drawings, the sizes and thicknesses of elements may be exaggerated for clarity. Even though all of elements of the embodiments according to the present invention have been described as being coupled or as being coupled and operating as one element, the present invention is not limited to the embodiments. That is, to the extent of the purpose of the present invention, all of such elements may be selectively coupled and operate as one or more elements. Such elements may be realized by each individual hardware, but all or part of such elements may be selectively combined into a computer program having a program module performing partial or all functions combined by single hardware or a plurality of hardware. Codes and code segments constituting the computer program may be easily inferred by those skilled in the art. Such computer program may be stored in computer readable media and read and executed by the computer to thereby realize the embodiments of the present invention. The computer readable media for the computer program may include magnetic recording media, optical recording media, and carrier wave media. In addition, in the description of embodiments, it will be understood that when an element is referred to as being "on" or "under" and "in front of" or "behind" another element, it may be directly on/under and in front of/behind the element, and one or more intervening elements may also be present between the two elements. The term "comprises", "includes", or "has" described herein needs to be interpreted not to exclude other elements but to further include such other elements since the corresponding elements may be included unless defined otherwise. All terms including technical or scientific terms have the same meanings as generally understood by those skilled in the art to which the disclosure pertains unless defined otherwise. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will be understood that, although the terms first, second, A, B, (a), (b), etc. may be used herein to describe various elements of the disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the description of embodiments, an apparatus for transferring wireless power on a wireless power system will be used interchangeably with a wireless power transmitter, a wireless power transmitting apparatus, a wireless power transmission apparatus, a transmission end, a transmitter, a transmission apparatus, a transmission side, a wireless power transfer apparatus, a wireless power transfer device, and the like for convenience of description. In addition, an apparatus for receiving wireless power from a wireless power transmission apparatus will be used interchangeably with a wireless power reception apparatus, a wireless power receiver, a wireless power receiving apparatus, a receiving terminal, a reception side, a reception apparatus, a receiver, and the like for convenience of description.

A wireless power transmitter according to the present invention can be configured in a pad type, a cradle type, an access point (AP) type, a small base station type, a stand type, a ceiling insert type, a wall-hanging type, a vehicle insert type, a vehicle mount type, or the like. A single transmitter can simultaneously transfer power to a plurality of wireless power reception apparatuses. To this end, the wireless power transmitter may provide at least one wireless power transfer scheme (including, for example, an electromagnetic induction scheme, an electromagnetic resonance scheme, and the like).

As an example, a wireless power transmission scheme may use various wireless power transmission standards based on an electromagnetic induction scheme of charging according to an electromagnetic induction principle that a magnetic field is generated from a coil of a power transmission end and electricity is induced from a coil of a reception end under the influence of the magnetic field. Here, the wireless power transmission standards of the electromagnetic induction scheme may include wireless charging technology of an electromagnetic induction scheme defined in the Wireless Power Consortium (WPC) and/or the Power Matters Alliance (PMA).

As another example, a wireless power transmission scheme may use an electromagnetic resonance scheme of synchronizing a magnetic field generated by a transmission coil of a wireless power transmitter with a specific resonance frequency and transferring power to a wireless power receiver located at a short distance. As an example, the electromagnetic resonance scheme may include wireless charging technology of a resonance scheme defined in the Alliance for Wireless Power (A4WP) that is the wireless charging technology standard organization.

As another example, a wireless power transmission scheme may use an RF wireless power transmission scheme of transferring power to a wireless power receiver located at a long distance away with a low-energy RF signal.

As another example, a wireless power transmitter according to the present invention may be designed to support at least two wireless power transmission schemes selected from the electromagnetic induction scheme, the electromagnetic resonance scheme, and the RF wireless power transmission scheme. The wireless power transmitter may determine a wireless power transmission scheme to be adaptively used for the wireless power receiver based on a type, a state, and required power of the wireless power receiver, as well as the wireless power transmission schemes supportable by the wireless power transmitter and the wireless power receiver.

In addition, a wireless power receiver according to an embodiment of the present invention may have at least one wireless power transmission scheme and may simultaneously receive wireless power from two or more wireless power transmitters. The wireless power transmission scheme may include at least one of the electromagnetic induction scheme, the electromagnetic resonance scheme, and the RF wireless power transmission scheme.

Embodiments may include a communication system that selectively uses various types of frequency bands from a low frequency (50 kHz) to a high frequency (15 MHz) and can exchange data and control signals for system control.

Embodiments may be applied to various industry fields such as a mobile terminal industry, a smart watch industry, a computer and notebook industry, a home appliance industry, an electric vehicle industry, a medical instrument industry, a robot industry, and the like.

In particular, a wireless power receiver according to the present invention may be mounted on a small-sized electronic device such as a mobile phone, a smart phone, a laptop computer, a digital broadcasting terminal, a personal digital assistants (PDA), a portable multimedia player (PMP), a navigation system, an MP3 player, an electric toothbrush, an electronic tag, an illumination apparatus, a remote controller, and a bobber, but is not limited thereto. The wireless power receiver according to the present invention may be any device as long as a wireless power reception means according to the present invention can be mounted thereon and can be battery-chargeable. A wireless power receiver according to another embodiment of the present invention may also be mounted on a vehicle, an unmanned aerial vehicle, an air drone, and the like.

Embodiments may consider a system that can transmit power to one or more devices by using one or more transmission coils.

According to embodiments, it is possible to solve a low battery problem in a mobile device such as a smart phone or a notebook. As an example, if a wireless charging pad is put on a table and a smart phone or a notebook is used on the wireless charging pad, a battery is automatically charged and thus the smart phone or the notebook is usable for a long time. In addition, if a wireless charging pad is installed in a public place such as a cafe, an airport, a taxi, an office, a restaurant, or the like, it is possible to charge various mobile devices, regardless of charging terminals different according to mobile device manufacturers. Furthermore, if the wireless power transmission technology is applied to household appliances such as cleaners, electric fans, or the like, a user need not look for a power cable here and there, and a tangled cable disappears in the home, thereby reducing wirings inside buildings and improving space utilization. Moreover, if an electric vehicle is charged with existing power for home use, a lot of time is taken. However, if high power is transmitted through the wireless power transmission technology, a charging time may be reduced. If a wireless charging facility is installed on the floor of a parking lot, it is possible to solve an inconvenience that must prepare a power cable around the electric vehicle.

The terms and abbreviations used in embodiments are as follows.

Wireless power transfer system: a system that provides wireless power transfer in a magnetic field region.

Wireless power transfer system-charger (power transfer unit (PTU): a device that provides wireless power transfer to a power receiver in a magnetic field region and manages an overall system and may also be referred to as a transmission apparatus or a transmitter.

Wireless power receiver system-device (power receiver unit (PRU)): a device that receives wireless power transfer from a power transmitter in a magnetic field region and may also be referred to as a reception apparatus or a receiver.

Charging area: an area in which actual wireless power transfer is performed in a magnetic field region and may be changed depending on the size, required power, and operating frequency of an application product.

S parameter (scatting parameter): a ratio of an input voltage to an output voltage on a frequency distribution, ratio (transmission; S21) of an input port to an output port or a self-reflection value of each input/output port, i.e., a value (reflection; S11 or S22) of an output reflected and returned by an input of each input/output port.

Quality factor Q: a value of Q in a resonant state represents a quality of frequency selection, wherein as the value of Q is higher, resonance characteristics are better, and the value of Q is expressed as a ratio of stored energy to energy loss in a resonator.

The principle of wireless power transfer will be described. The principle of wireless power transfer is largely divided into a magnetic induction scheme and an electromagnetic resonance scheme.

The magnetic induction scheme is a non-contact energy transfer technology in which, when a source inductor (Ls) and a load inductor (Ll) approach each other, an electromotive force is generated in the load inductor (Ll) by the medium of magnetic flux generated as current flows in the source inductor (Ls). In addition, the electromagnetic resonance scheme is a technology for wirelessly transferring energy by using a resonance technique in which as magnetic resonance is generated by a natural frequency between two resonators by coupling the two resonators, the two resonators form electric and magnetic fields in the same wavelength range while vibrating at the same frequency.

FIG. 1 is an equivalent circuit diagram of a magnetic induction scheme.

Referring to FIG. 1, in the equivalent circuit of the magnetic induction scheme, a wireless power transfer system-charger may be implemented by a source voltage Vs according to a device for supplying power, a source resistor Rs, a source capacitor Cs for impedance matching, and a source coil Ls for a magnetic coupling with a wireless power transfer system-device. The wireless power transfer system-device may be implemented by a load resistor Rl that is an equivalent resistor of the wireless power transfer system-device, a load capacitor Cl for impedance matching, and a load coil Ll for a magnetic coupling with the wireless power transfer system-charger, wherein the degree of magnetic coupling between the source coil Ls and the load coil Ll may be denoted by a mutual inductance Msl.

In FIG. 1, a ratio S21 of an input voltage to an output voltage is calculated from a magnetic induction equivalent circuit including only a coil without the source capacitor Cs and the load capacitor Cl for the impedance matching, and a maximum power transfer condition is found from the calculation. Then, the maximum power transfer condition satisfies the following Equation 1.

$$Ls/Rs=Ll/Rl \quad \text{[Equation 1]}$$

According to Equation 1, maximum power transfer is possible when a ratio of an inductance of the transmission coil Ls to the source resistance Rs is equal to a ratio of an inductance of the load coil Ll to the load resistance Rl. Since a capacitor for compensating for a reactance does not exist in a system in which only an inductance exist, a self-reflection value S11 of an input/output port may not become 0 at a position at which maximum power transfer is achieved, and power transfer efficiency may be greatly varied according to the mutual inductance Msl. Therefore, the source capacitor Cs as a compensation capacitor for impedance matching may be added to the wireless power transfer system-charger, and the load capacitor Cl as a compensation capacitor for impedance matching may be added to the wireless power receiver system-device. The compensation capacitors Cs and Cl, for example, may be connected in series or parallel to the reception coil Ls and the load coil Ll, respectively. In addition to the compensation capacitors, passive elements such as an additional capacitor and an additional inductor may be further added to each of the wireless power transfer system-charger and the wireless power receiver system-device.

Figure 2:
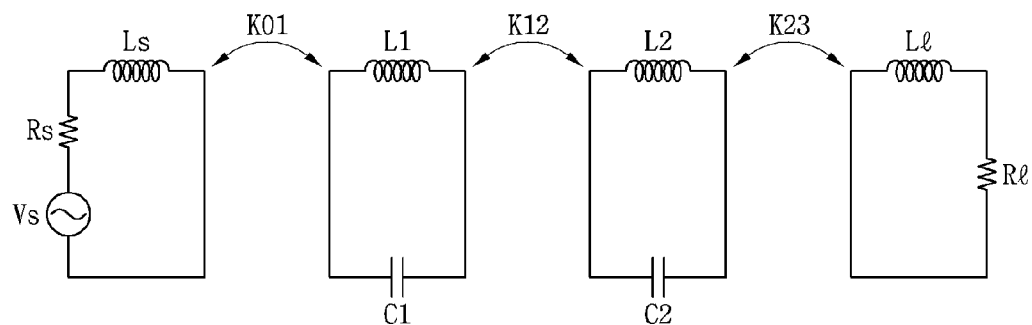
FIG. 2 is an equivalent circuit diagram of an electromagnetic resonance scheme.

FIG. 2 is an equivalent circuit diagram of an electromagnetic resonance scheme.

Referring to FIG. 2, in the equivalent circuit of the electromagnetic resonance scheme, a wireless power transfer system-charger is implemented by a source coil forming a closed loop circuit through a serial connection of a source voltage Vs, a source resistor Rs, and a source inductor Ls, and a transmission-side resonant coil forming a closed loop circuit through a serial connection of a transmission-side resonant inductor L1 and a transmission-side resonant capacitor C1. A wireless power receiver system-device is implemented by a load coil forming a closed loop circuit through a serial connection of a load resistor R1 and a load inductor L1, and a reception-side resonant coil forming a closed loop circuit through a serial connection of a reception-side resonant inductor L2 and a reception-side resonant capacitor C2. The source inductor Ls and the transmission-side inductor L1 are magnetically coupled with a coupling coefficient of K01, the load inductor L1 and the reception-side resonant inductor L2 are magnetically coupled with a coupling coefficient of K23, and the transmission-side resonant inductor L1 and the reception-side resonant inductor L2 are magnetically coupled with a coupling coefficient of K12. An equivalent circuit according to another embodiment may be implemented by only a transmission-side resonant coil and a reception-side resonant coil without a source coil and/or a load coil.

In the electromagnetic resonance scheme, most of the energy in a resonator of the wireless power transfer system-charger is transferred to a resonator of the wireless power receiver system-device when the resonance frequencies of the two resonators are equal to each other, so that the power transfer efficiency can be improved. In addition, the efficiency of the electromagnetic resonance scheme becomes better when the following Equation 2 is satisfied.

$$k/\Gamma >> 1 \ (k \text{ is a coupling coefficient, and } \Gamma \text{ is a damping ratio}) \quad \text{[Equation 2]}$$

In the electromagnetic resonance scheme, elements for the impedance matching may be added to improve the efficiency, and the impedance matching elements may be passive elements such as an inductor and a capacitor.

A wireless power transfer system for transferring power in the magnetic induction scheme or the electromagnetic resonance scheme based on the principle of wireless power transfer will be described below.

<Wireless Power Transfer System-Charger>

Figure 3A:
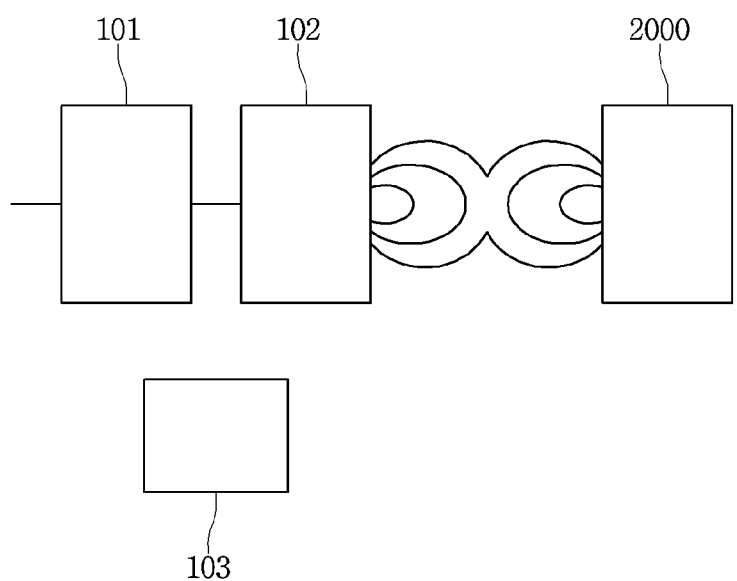

FIGS. 3a and 3b are block diagrams illustrating a wireless power transfer system-charger that is one of sub-systems constituting a wireless power transfer system.

Referring to FIG. 3a, the wireless power transfer system according to an embodiment may include a wireless power transfer system-charger 1000 and a wireless power receiver system-device 2000 that wirelessly receives power from the wireless power transfer system-charger 1000. The wireless power transfer system-charger 1000 may include: a power conversion unit 101 that performs power conversion on an input AC signal to output an AC signal; a resonant circuit unit 102 that generates a magnetic field on the basis of the AC signal output from the power conversion unit 101 to provide power to the wireless power receiver system-device 2000 in a charging area; and a control unit 103 that controls the power conversion of the power conversion unit 101, adjusts an amplitude and a frequency of an output signal of the power conversion unit 101, performs impedance matching of the resonant circuit unit 102, senses information on impedance, voltage, and current from the power conversion unit 101 and the resonant circuit unit 102, and performs wireless communication with the wireless power receiver system-device 2000. The power conversion unit 101 may include at least one of a power conversion unit for converting an AC signal into a DC signal, a power conversion unit for outputting a DC signal by varying a level of the DC signal, and a power conversion unit for converting a DC signal to an AC signal. In addition, the resonant circuit unit 102 may include a coil and an impedance matching unit capable of resonating with the coil. In addition, the control unit 103 may include a sensing unit for sensing information on impedance, voltage, and current and a wireless communication unit.

Specifically, referring to FIG. 3b, the wireless power transfer system-charger 1000 may include a transmission-side AC/DC conversion unit 1100, a transmission-side DC/AC conversion unit 1200, a transmission-side impedance matching unit 1300, a transfer coil unit 1400, and a transmission-side communication and control unit 1500.

The transmission-side AC/DC conversion unit 1100 is a power conversion unit that converts an AC signal received from the outside into a DC signal under the control of the transmission-side communication and control unit 1500. The transmission-side AC/DC conversion unit 1100 may be a sub-system including a rectifier 1110 and a transmission-side DC/DC conversion unit 1120. The rectifier 1110 is a system for converting the supplied AC signal into the DC signal. A diode rectifier having relatively high efficiency when operating at high frequencies, a synchronous rectifier prepared as one-chip, or a hybrid rectifier capable of reducing cost and space and having a high degree of freedom of dead time may be used as an embodiment for implementing the rectifier 1110. However, the present invention is not limited thereto, and any system for converting an AC signal into a DC signal may be applied. In addition, the transmission-side DC/DC conversion unit 1120 adjusts a level of the DC signal provided by the rectifier 1110 under the control of the transmission-side communication and control unit 1500. A buck converter that lowers a level of the input signal, a boost converter that increases the level of the input signal, and a buck boost converter or a Cuk converter that lowers or increases the level of the input signal may be used and as an embodiment for implementing the transmission-side DC/DC converter 1120. In addition, the transmission-side DC/DC conversion unit 1120 may include a switch element that controls a power conversion, an inductor and a capacitor that serve as power conversion medium or smooth the output voltage, and a transformer that adjusts a voltage gain or performs an electrical separation (insulation) function, and may remove a ripple component or a pulsation component included in the input DC signal (AC component included in DC component). Further, an error between a command value of the output signal of the transmission-side DC/DC conversion unit 1120 and an actual output value may be adjusted through a feedback scheme, which can be performed by the transmission-side communication and control unit 1500.

The transmission-side DC/AC conversion unit 1200 is a system capable of converting the DC signal outputted from the transmission-side AC/DC conversion unit 1100 into the AC signal under the control of the transmission-side communication and control unit 1500 and adjusting a frequency of the converted AC signal. A half bridge inverter or a full bridge inverter may be used as an embodiment for implementing the transmission-side DC/AC conversion unit 1200. In addition, various amplifiers for converting a DC signal into an AC signal may be applied to the wireless power transfer system, and examples of the amplifiers include class A, B, C, E, and F amplifiers. In addition, the transmission-side DC/AC conversion unit 1200 may include an oscillator that generates the frequency of the output signal and a power amplification unit that amplifies the output signal.

The configuration of the AC/DC conversion unit 1100 and the transmission-side DC/AC conversion unit 1200 may be replaced by an AC power supply, and may be omitted or be replaced by another configuration.

The transmission-side impedance matching unit 1300 minimizes a reflection wave at a position at which impedances are different, thereby improving a signal flow. Since two coils of the wireless power transfer system-charger 1000 and the wireless power receiver system-device 2000 are spatially separated from each other, a large amount of magnetic field leaks out. Accordingly, the efficiency of power transfer can be improved by compensating for the impedance difference between two connecting parts of the wireless power transfer system-charger 1000 and the wireless power receiver system-device 2000. The transmission-side impedance matching unit 1300 may include at least one of an inductor, a capacitor, and a resistor, and may adjust an impedance value for the impedance matching by varying an inductance of the inductor, a capacitance of the capacitor, and a resistance of the resistor under the control of the communication and control unit 1500. In addition, when the wireless power transfer system transfers power by the magnetic induction scheme, the transmission-side impedance matching unit 1300 may have a serial resonance structure or a parallel resonance structure, and energy loss can be minimized by increasing an induction coupling coefficient between the wireless power transfer system-charger 1000 and the wireless power receiver system-device 2000. Further, when the wireless power transfer system transfers power by the electromagnetic resonance scheme, the transmission-side impedance matching unit 1300 allows the impedance to be matched in real time according to a change in the distance between the wireless power transfer system-charger 1000 and the wireless power receiver system-device 2000 or mutual influence from metallic foreign objects (F0) and various devices, and a multiple matching scheme using a capacitor, a matching scheme using multiple antennas, a scheme using multiple loops may be used as the compensation scheme.

The transmission-side coil unit 1400 may be implemented by a plurality of coils or a single coil. When the transmission-side coil unit 1400 includes a plurality of coils, the coils may be spaced apart from each other or overlap one another. When the coils overlap one another, an overlapped area may be determined by taking into account a deviation of a magnetic flux density. In addition, the transmission-side coil unit 1400 may be produced by taking into account an internal resistance and a radiation resistance. In this case, if the resistance component is small, the quality factor and the transmission efficiency can be improved.

The communication and control unit 1500 may include a transmission-side control unit 1510 and a transmission-side communication unit 1520. The transmission-side control unit 1510 may function to adjust the output voltage (or current (Itx_coil) flowing through a transfer coil) of the transmission-side AC/DC conversion unit 1100 by taking into account at least one of an amount of required power, a currently charged amount, a voltage (Vrect) of a rectifier output terminal of the wireless power receiver system-device 2000, a charging efficiency of each of a plurality of wireless power receiver system-devices, and a wireless power scheme. In addition, the power to be transmitted may be controlled by generating a frequency and a switching waveform to drive the transmission-side DC/AC conversion unit 1200 by taking into account the maximum power transmission efficiency. Further, an algorithm, a program, or an application required for the control which is read from a storage unit (not shown) of the wireless power receiver system-device 2000 may be used to control an overall operation of the wireless power receiver system-device 2000. Meanwhile, the transmission-side controller 1510 may also be referred to as a microprocessor, a micro-controller unit, or a micom. The transmission-side communication unit 1520 may communicate with a reception-side communication unit 2620, and may use a short-range communication scheme such as Bluetooth, NFC, or Zigbee as an example of a communication scheme. The transmission-side communication unit 1520 and the reception-side communication unit 2620 may transceive charging status information and charging control commands with each other. In addition, the charging status information may include the number of wireless power receiver system-devices 2000, a remaining battery level, the number of charging operations, an amount of usage, a battery capacity, a ratio of a battery, and an amount of transferred power of the wireless power transfer system-charger 1000. In addition, the transmission-side communication unit 1520 may transmit a charging function control signal to control a charging function of the wireless power receiver system-device 2000, and the charging function control signal may be a control signal for enabling or disabling the charging function by controlling the wireless power receiver system-device 2000.

As described above, the transmission-side communication unit 1520 may perform communicate by using an out-of-band scheme in which the transmission-side communication unit 1520 is configured as a separate module, but the present invention is not limited thereto. The transmission-side communication unit 1520 may perform communication in an in-band scheme in which the wireless power receiver system-device transfers a feedback signal to the wireless power transfer system-charger by using a power signal transferred by the wireless power transfer system-charger, and the wireless power transfer system-charger transfers a signal to the wireless power receiver system-device by using a frequency (frequency shift) of the power signal transferred by the wireless power transfer system-charger. For example, the wireless power receiver system-device may modulate a feedback signal to transfer information on a charging start, a charging end, a battery status, and the like to the wireless power transfer system-charger through the feedback signal. In addition, the transmission-side communication unit 1520 may be configured separately from the transmission-side control unit 1510, and the reception-side communication unit 2620 of the wireless power receiver system-device 2000 may be included in a control unit 2610 of the wireless power receiver system-device 2000 or may be configured separately from the control unit 2610.

In addition, the wireless power transfer system-charger 1000 of the wireless power transfer system according to an embodiment may further include a detection unit 1600.

The detection unit 1600 may detect at least one of an input signal of the transmission-side AC/DC conversion unit 1100, an output signal of the transmission-side AC/DC conversion unit 1100, an input signal of the transmission-side DC/AC conversion unit 1200, an output signal of the transmission-side DC/AC conversion unit 1200, an input signal of the transmission-side impedance matching unit 1300, an output signal of the transmission-side impedance matching unit 1300, an input signal of the transmission-side coil unit 1400, and a signal on the transmission-side coil unit 1400. For example, the signal may include at least one of information on current, information on voltage, and information on impedance. The detected signal is fed back to the communication and control unit 1500, and the communication and control unit 1500 may control the transmission-side AC/DC conversion unit 1100, the transmission-side DC/AC conversion unit 1200, and the transmission-side impedance matching unit 1300, based on the detected signal. Also, the communication and control unit 1500 may perform a foreign object detection (FOD), based on a detection result of the detection unit 1600. In addition, the detected signal may be one of voltage and current. Meanwhile, the detection unit 1600 may be configured as hardware different from the communication and control unit 1500, or the detection unit 1600 and the communication and control unit 1500 may be implemented as single hardware.

<Wireless Power Receiver System-Device>

Figure 4A:
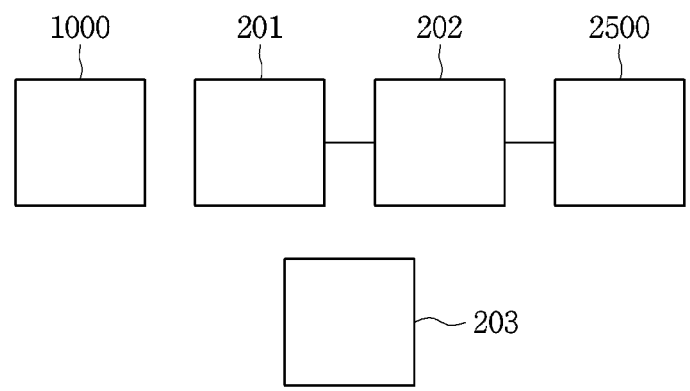

FIGS. 4a and 4b are block diagrams illustrating a power receiver unit (or, a wireless power receiver system-device) that is one of sub-systems constituting the wireless power transfer system.

Referring to FIG. 4a, the wireless power transfer system according to an embodiment may include a wireless power transfer system-charger 1000 and a wireless power receiver system-device 2000 that wirelessly receives power from the wireless power transfer system-charger 1000. The wireless power receiver system-device 2000 may include: a reception-side resonant circuit unit 201 that receives an AC signal transferred from the wireless power transfer system-charger 1000; a reception-side power conversion unit 202 that performs power conversion on the AC power from the reception-side resonant circuit unit 201 to output a DC signal; a load 2500 that receives the DC signal output from the reception-side power conversion unit 202 and performs charging; and a reception-side control unit 203 that senses a current/voltage of the reception-side resonant circuit unit 201, performs impedance matching of the reception-side resonant circuit unit 201, controls power conversion of the reception-side power conversion unit 201, adjusts a level of the output signal of the reception-side power conversion unit 202, senses an input/output voltage or current of the reception-side power conversion unit 202, controls the supply of the output signal of the reception-side power conversion unit 202 to the load 2500, or communicates with the wireless power transfer system-charger 1000. In addition, the reception-side power conversion unit 202 may include a power conversion unit for converting an AC signal into a DC signal, a power conversion unit for outputting a DC signal by varying a level of the DC signal, and a power conversion unit for converting a DC signal into an AC signal. Referring to FIG. 4b, the wireless power transfer system may include a wireless power transfer system-charger (or a wireless power transmission apparatus) 1000 and a wireless power receiver system-device (or a wireless power reception apparatus) 2000 that wirelessly receives power from the wireless power transfer system-charger 1000. The wireless power receiver system-device 2000 may include a reception-side resonant circuit unit 2120, which is configured with a reception-side coil unit 2100 and a reception-side impedance matching unit 2200, a reception-side AC/DC conversion unit 2300, a reception-side DC/DC conversion unit 2400, a load 2500, and a reception-side communication and control unit 2600. In addition, the reception-side AC/DC conversion unit 2300 may also be referred to as a rectification unit that rectifies an AC signal into a DC signal.

The reception-side coil unit 2100 may receive power through the magnetic induction scheme or the electromagnetic resonance scheme. Accordingly, the reception-side coil unit 2100 may include at least one of an induction coil and a resonant coil according to a power reception scheme.

According to an embodiment, the reception-side coil unit 2100 may be disposed in a mobile terminal together with a near field communication (NFC) antenna. In addition, the reception-side coil unit 2100 may be the same as the transmission-side coil unit 1400, and a dimension of a reception antenna may vary according to electrical characteristics of the wireless power receiver system-device 2000.

The reception-side impedance matching unit 2200 may perform impedance matching between the wireless power transfer system-charger 1000 and the wireless power receiver system-device 2000.

The reception-side AC/DC conversion unit 2300 generates a DC signal by rectifying an AC signal output from the reception-side coil unit 2100. In addition, an output voltage of the reception-side AC/DC conversion unit 2300 may also be referred to as a rectification voltage Vrect. The reception-side communication and control unit 2600 may detect or vary the output voltage of the reception-side AC/DC conversion unit 2300 and may transfer, to the wireless power transfer system-charger 1000, status parameter information such as information on a minimum rectification voltage Vrect_min (or minimum output voltage Vrect_min), which is a minimum value of the output voltage of the reception-side AC/DC converting unit 2300, a maximum rectification voltage Vrect_max (or maximum output voltage Vrect_max), which is a maximum value of the output voltage of the reception-side AC/DC converting unit 2300, and an optimal rectification voltage Vrect_set (or optimal output voltage Vrect_set), which has any one of the minimum value and the maximum value.

The reception-side DC/DC conversion unit 2400 may adjust a level of the DC signal output from the reception-side AC/DC conversion unit 2300 in match with the capacitance of the load 2500.

The load 2500 may include a battery, a display, an audio output circuit, a main processor, and various sensors.

The reception-side communication and control unit 2600 may be activated by wake-up power from the transmission-side communication and control unit 1500, communicate with the transmission-side communication and control unit 1500, and control the operations of the sub-systems of the wireless power receiver system-device 2000.

The wireless power receiver system-device 2000 may be provided in a single number or plural numbers to wirelessly receive energy from the wireless power transfer system-charger 1000 at the same time. That is, in the wireless power transfer system using the electromagnetic resonance scheme, a plurality of target wireless power receiver system-devices 2000 may receive power from one wireless power transfer system-charger 1000. In this case, the transmission-side impedance matching unit 1300 of the wireless power transfer system-charger 1000 may adaptively perform impedance matching between the plurality of wireless power receiver system-devices 2000. This may be equally applied even when the magnetic induction scheme includes a plurality of reception-side coil units that are independent of each other.

In addition, when a plurality of wireless power receiver system-devices 2000 are provided, the systems may have the same power reception scheme or different power reception schemes. In this case, the wireless power transfer system-charger 1000 may be a system that transfers power in the magnetic induction scheme or the electromagnetic resonance scheme or a system that uses both of the schemes.

Meanwhile, a magnitude and a frequency relationship of the signal of the wireless power transfer system will be described. In the case of the wireless power transfer using the magnetic induction scheme, the transmission-side AC/DC conversion unit 1100 in the wireless power transfer system-charger 1000 may receive an AC signal of a few tens or hundreds of V (e.g., 110 V to 220 V) or a few tens or hundreds of Hz (e.g., 60 Hz), convert the AC signal into a DC signal of a few or tens of V (e.g., 10 V to 20 V), and output the DC signal. The transmission-side DC/AC conversion unit 1200 in the wireless power transfer system-charger 1000 may receive the DC signal and output an AC signal of a few hundreds of kHz (e.g., 125 kHz). In addition, the reception-side AC/DC conversion unit 2300 in the wireless power receiver system-device 2000 may receive the AC signal of a few hundreds of kHz (e.g., 125 kHz), convert the AC signal into a DC signal of a few or tens of V (e.g., 10 V to 20 V), and output the DC signal. The reception-side DC/DC conversion unit 2400 in the wireless power receiver system-device 2000 may output the DC signal, for example a DC signal of 5 V, appropriate for the load 2500 and transfer the DC signal to the load 2500. In addition, in the case of the wireless power transfer using the electromagnetic resonance scheme, the transmission-side AC/DC conversion unit 1100 in the wireless power transfer system-charger 1000 may receive an AC signal of a few tens or hundreds of V (e.g., 110 V to 220 V) and a few tens or hundreds of Hz (e.g., 60 Hz), convert the AC signal into a DC signal of a few or tens of V (e.g., 10 V to 20 V), and output the DC signal. The transmission-side DC/AC conversion unit 1200 in the wireless power transfer system-charger 1000 may receive the DC signal and output an AC signal having a frequency of a few of MHz (e.g., 6.78 MHz). Further, the reception-side AC/DC conversion unit 2300 in the wireless power receiver system-device 2000 may receive the AC signal having the frequency of a few of MHz (e.g., 6.78 MHz), convert the AC signal into a DC signal having a voltage of a few or tens of V (e.g., 10 V to 20 V), and output the DC signal. In addition, the reception-side DC/DC conversion unit 2400 may output a DC signal, for example the DC signal of 5 V, appropriate for the load 2500 and transfer the DC signal to the load 2500.

Figure 5:
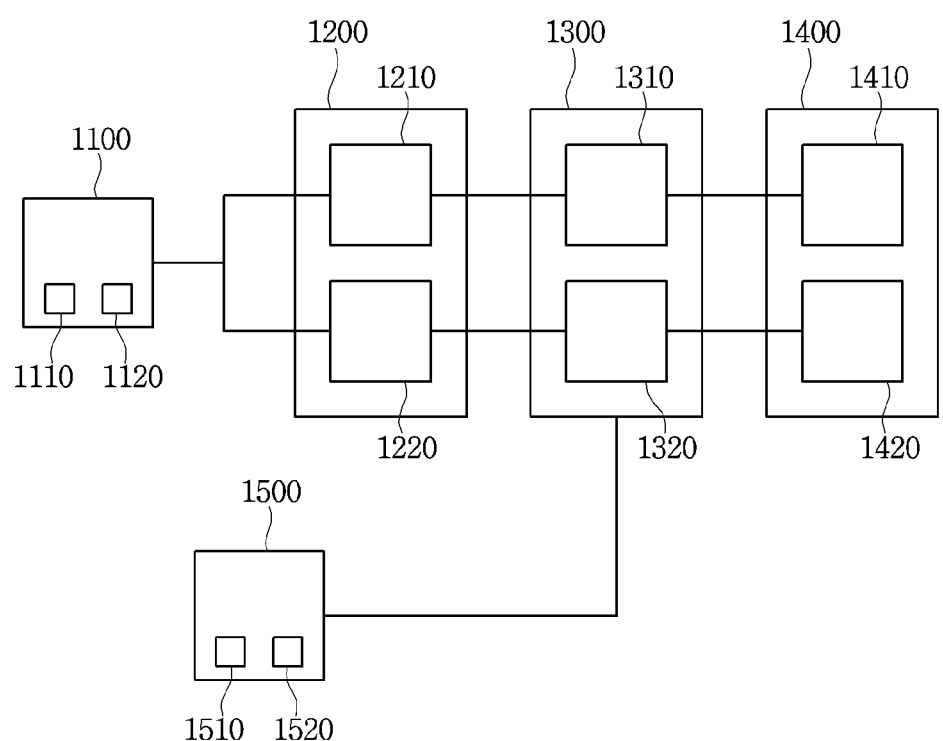
FIG. 5 is a block diagram illustrating the wireless power transfer system-charger according to an embodiment of the present invention.

FIG. 5 is a block diagram illustrating the wireless power transfer system-charger according to an embodiment of the present invention.

Referring to FIG. 5, the transmission-side DC/AC conversion unit 1200 of the wireless power transfer system-charger 1000 according to the first and second embodiments of the present invention may include first and second DC/AC conversion units 1210 and 1220, and the transmission-side impedance matching unit 1300 may include first and second impedance matching units 1310 and 1320. The transmission-side coil unit 1400 may include first and second transmission-side coil units 1410 and 1420.

The wireless power transfer system-charger 1000 according to the first embodiment may include a first transmission-side coil unit 1410, a second transmission-side coil unit 1420, and a loss suppression unit 1430 including a resonant circuit connected to both ends of the second transmission-side coil unit 1420. The resonant circuit of the loss suppression unit 1430 may resonate in response to a signal of a first frequency for driving the first transmission-side coil unit 1410. The resonant circuit may include at least one capacitor and at least one inductor. The resonant circuit may be a serial resonant circuit. In addition, the loss suppression unit 1430 may have an impedance magnitude equal to or greater than a preset impedance magnitude at a second frequency for driving the second transmission-side coil unit 1420. In this case, the preset impedance magnitude may be a threshold value preset by taking into account the minimization of influence of the loss suppression unit 1430 on the second transmission-side coil unit 1420 at the second frequency.

The wireless power transfer system-charger 1000 according to the second embodiment may include a first transmission-side coil unit 1410, a second transmission-side coil unit 1420, and a switch unit 1430 connected to both ends of the second transmission-side coil unit 1420. The switch unit 1430 may include at least one switch element. The switch unit 1430 is turned on and closed when wireless power is transferred by driving the first transmission-side coil unit 1410, thereby obtaining the same effect as the parallel connection of a conducting wire to both ends of the second transmission-side coil unit 1420. The switch unit 1430 is turned off and opened when wireless power is transferred by driving the second transmission-side coil unit 1420, thereby obtaining the same effect as the parallel connection of an infinite resistor to both ends of the second transmission-side coil unit 1420.

The first transmission-side coil units 1410 according to the first and second embodiments may be resonance-type coil units. In this case, the first DC/AC conversion unit 1210 may provide, to the resonance-type coil unit 1410, AC power having the first frequency of 6.78 MHz or a frequency close to 6.78 MHz. The first impedance matching unit 1310 may perform impedance matching between the resonance-type coil unit 1410 and the reception-side coil unit 2100 of the wireless power receiver system-device 2000.

In addition, the second transmission-side coil units 1420 according to the first and second embodiments may be induction-type coil units. In this case, the second DC/AC conversion unit 1220 may provide, to the induction-type coil unit 1420, AC power having the second frequency of 125 KHz or a frequency close to 125 KHz. The second impedance matching unit 1320 may perform impedance matching between the induction-type coil unit 1410 and the reception-side coil unit 2100 of the wireless power receiver system-device 2000.

Meanwhile, the transmission-side communication and control units 1500 according to the first and second embodiments may control either the first DC/AC conversion unit 1210 or the second DC/AC conversion unit 1220 so that the wireless power transfer system-charger 1000 transfers wireless power in the electromagnetic resonance scheme or the magnetic induction scheme. That is, the transmission-side communication and control unit 1500 may enable the first DC/AC conversion unit 1210 so as to drive the first DC/AC conversion unit 1210, disable the second DC/AC conversion unit 1220 so as not to drive the second DC/AC conversion unit 1220, and supply the signal of the first frequency to the resonance-type coil unit 1410, so that the wireless power transfer system-charger 1000 transfers power to the wireless power receiver system-device 2000 in the electromagnetic resonance scheme. The transmission-side communication and control unit 1500 may enable the second DC/AC conversion unit 1220, disable the first DC/AC conversion unit 1210, and supply the signal of the second frequency to the induction-type coil unit 1420, so that the wireless power transfer system-charger 1000 transfers power to the wireless power receiver system-device 2000 in the magnetic induction scheme.

Meanwhile, according to the second embodiment, in the case of driving the first DC/AC conversion unit 1210 and not driving the second DC/AC conversion unit 1220, the switch element of the switch unit 1430 may be closed by a switching control signal from the transmission-side communication and control unit 1500 in synchronization with the operation of the first DC/AC conversion unit 1210. In the case of driving the second DC/AC conversion unit 1220 and not driving the first DC/AC conversion unit 1210, the switch element of the switch unit 1430 may be closed by the switching control signal from the transmission-side communication and control unit 1500 in synchronization with the operation of the second DC/AC conversion unit 1220.

Figure 6:
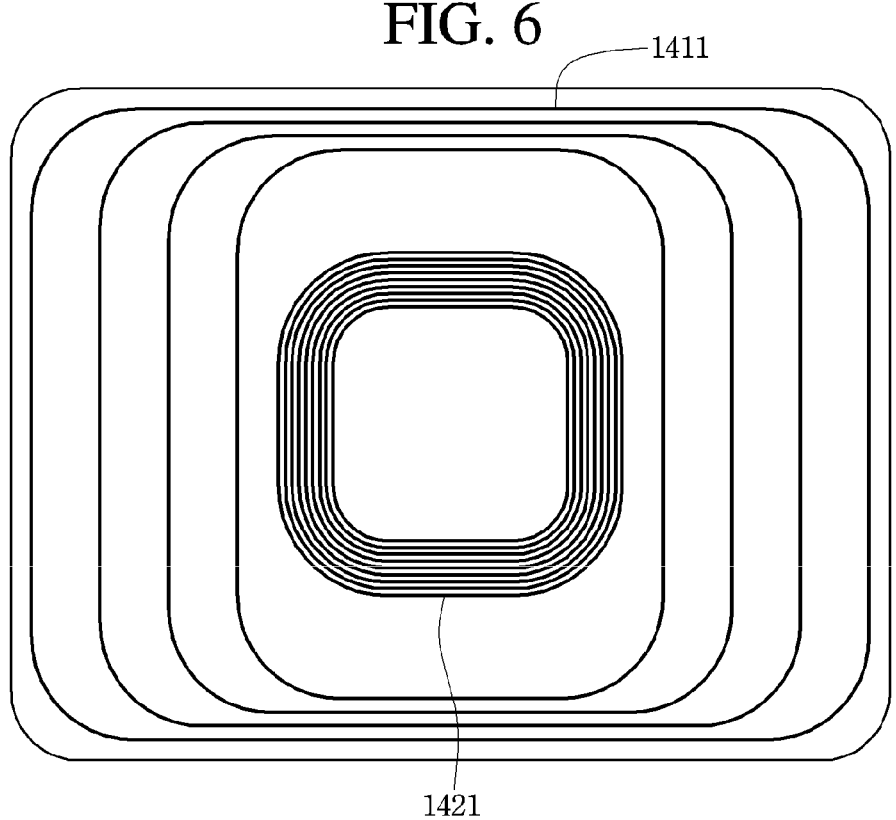
FIGS. 6 and 7 are views illustrating a structure of a transmission-side coil unit according to an embodiment of the present invention.
Figure 7:
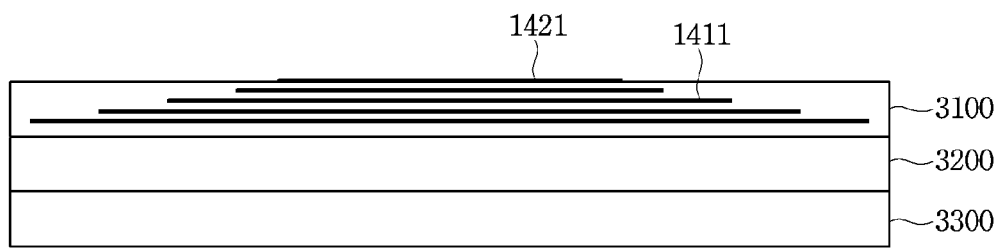

FIGS. 6 and 7 are views illustrating the structure of the transmission-side coil unit according to an embodiment of the present invention.

Referring to FIGS. 6 and 7, the transmission-side coil unit 1400 according to the first and second embodiments may include a coil printed circuit board 3100, on which a coil is mounted, a shielding member 3200 bonded on one surface of the coil printed circuit board 3100, and a transmission printed circuit board 3300 bonded on one surface of the shielding member 3200 to transfer an electrical signal to the coil. In addition, a resonant coil 1411 constituting the resonance-type coil unit 1410 and an induction coil 1421 constituting the induction-type coil unit 1420 may be formed on the coil printed circuit board 3100. The resonant coil 1411 may be disposed to surround an edge of the coil printed circuit board 3100, and the induction coil 1421 may be disposed in a central region of the coil printed circuit board 3100 such that the resonant coil 1411 surrounds the induction coil 1421.

The shielding member 3200 according to the first and second embodiments may electrically isolate the coil printed circuit board 3100 from the transmission printed circuit board 3300 to thereby minimize influence of the electric field generated by the driving of the transmission printed circuit board 3300 on the resonant coil 1411 and the induction coil 1421 and influence of the electric field generated by the driving of the resonant coil 1411 and the induction coil 1421 on the transmission printed circuit board 3300.

Figure 8:
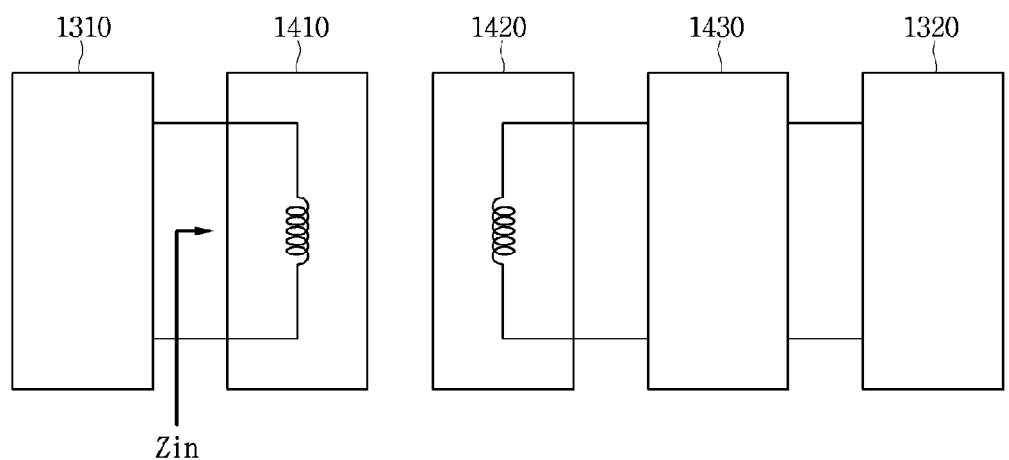
FIG. 8 is a block diagram illustrating a transmission-side coil unit according to an embodiment of the present invention.
Figure 9:
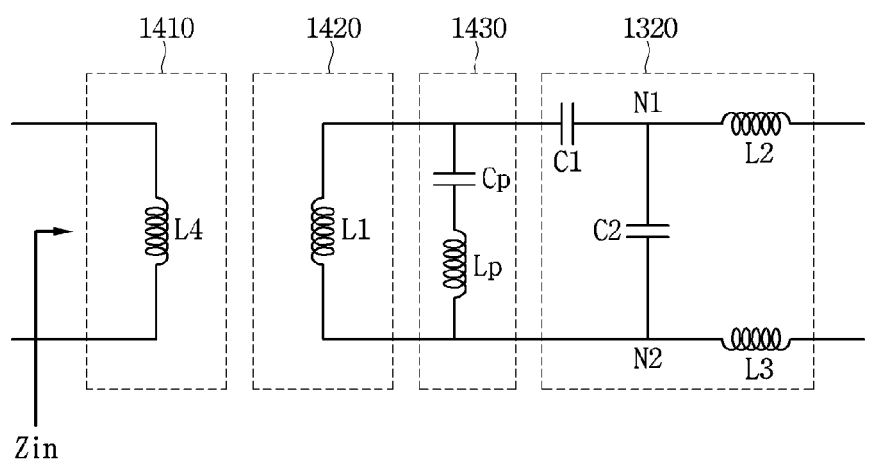
FIG. 9 is an equivalent circuit diagram of a transmission-side coil unit.

FIG. 8 is a block diagram illustrating the transmission-side coil unit according to the first and second embodiments, and FIG. 9 is an equivalent circuit diagram of the transmission-side coil unit according to the first embodiment.

<Transmission-Side Coil Unit According to First Embodiment>

Referring to FIGS. 8 and 9, the transmission-side coil unit 1400 according to the first embodiment of the present invention may include a resonance-type coil unit 1410, an induction-type coil unit 1420, and a loss suppression unit 1430.

The loss suppression unit 1430 may be connected between the induction-type coil unit 1420 and the second impedance matching unit 1320. Specifically, the loss suppression unit 1430 may be connected in parallel to the induction-type coil unit 1420 and connected in parallel to the second impedance matching unit 1320.

When an AC signal of a first driving frequency is supplied to the resonance-type coil unit 1410, the loss suppression unit 1430 may short-circuit both ends of the induction-type coil unit 1420. In other words, the loss suppression unit 1430 may make both ends of the induction-type coil unit 1420 be 0 V.

When each element is expressed as an equivalent circuit, the induction-type coil unit 1420 may be expressed as a first inductor L1, the second impedance matching unit 1320 may expressed as a first capacitor C1 having one end connected to one end of the induction-type coil unit 1420 and the other end connected to a first node N1, a second capacitor C2 having one end connected to the first node N1 and the other end connected to a second node N2, a second inductor L2 having one end connected to the first node N1 and the other end connected to one end of the second DC/AC conversion unit 1220, and a third inductor having one end connected to the second node N2 and the other end connected to the other end of the second DC/AC conversion unit 1220, and the resonance-type coil unit 1410 may be expressed as a fourth inductor L4.

The loss suppression unit 1430 may include a loss suppression capacitor Cp and a loss suppression inductor Lp.

The loss suppression capacitor Cp and the loss suppression inductor Lp may be connected in series to each other and connected to both ends of the first inductor L1. In other words, the loss suppression capacitor Cp and the loss suppression inductor Lp may be connected between one end of the first capacitor C1 and the second node N2.

Hereinafter, the function of the loss suppression unit 1430 will be described in detail.

In a state in which the loss suppression unit 1430 is not connected, when the signal of the first frequency f1 is applied to the resonance-type coil unit 1410, an input impedance Zin looking from the resonance-type coil unit 1410 into the induction-type coil unit 1420, that is, an input impedance Zin looking from the fourth inductor L4 into the induction-type coil unit 1420, may satisfy Equation 3 below:

$$Z_{in} = j\omega L_4 + \frac{\omega^2 M_1^2}{j\omega L_1 + Z_1} = j\omega L_4 + \frac{\omega^2 M_1^2}{j\omega L_1 + (R_1 + jX_1)} = $$
$$j\omega L_4 + \frac{\omega^2 M_1^2 (R_1 - j(\omega L_1 + X_1))}{R_1^2(\omega L_1 + X_1)^2} = $$
$$j\omega L_4 - j\frac{\omega^2 M_1^2 (\omega L_1 + X_1)}{R_1^2 + (\omega L_1 + X_1)^2} + \frac{\omega^2 M_1^2 R_1}{R_1^2 + (\omega L_1 + X_1)^2}$$

[Equation 3]

(In Equation 3, $M_1^2 = k^2 L_4 L_1$, M1 is a mutual inductance, k is a coupling coefficient, ω is a first frequency, and Z1=R1+jX1.)

It can be seen from Equation 3 that a real part of the input impedance Zin is present, and the real part may cause power loss.

In a state in which the loss suppression unit 1430 is connected, when the signal of the first frequency f1 is applied to the resonance-type coil unit 1410 and the loss suppression unit 1430 becomes a resonant state due to the first frequency f1, an input impedance Zin looking from the resonance-type coil unit 1410 into the induction-type coil unit 1420, that is, an input impedance Zin looking from the fourth inductor L4 into the induction-type coil unit 1420, may satisfy Equation 4 below:

$$Z_{in} = j\omega L_4 + \frac{\omega^2 M_1^2}{j\omega L_1} = j\omega L_4 + \frac{\omega^2 k^2 L_4 L_1}{j\omega L_1} =$$
$$j\omega L_4 + \frac{-j\omega L_4 j\omega L_1 k^2}{j\omega L_1} =$$
$$j\omega L_4 - j\omega L_4 k^2 = j\omega L_4(1 - k^2)$$

[Equation 4]

It can be seen from Equation 4 that the real part is absent in the input impedance Zin. Due to the absence of the real part, when the resonance-type coil unit 1410 is driven at the first frequency f1, power loss in the induction-type coil unit 1420 is ideally zero, and in practice, power loss is minimized.

Figure 10:
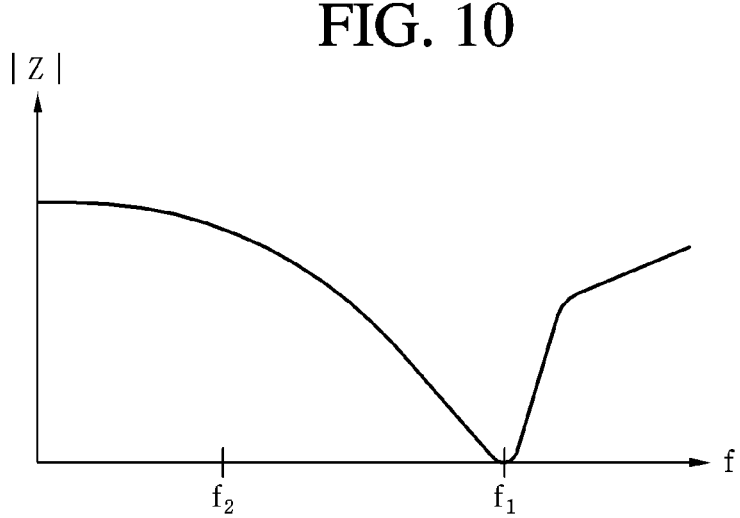
FIG. 10 is a graph showing an impedance magnitude of a loss suppression unit according to a frequency.

FIG. 10 is a graph showing an impedance magnitude of the loss suppression unit according to a frequency.

Referring to FIG. 10, it can be seen that the impedance magnitude of the loss suppression unit 1430 according to the frequency is minimized at a specific frequency. That is, values of elements included in the loss suppression unit 1430 may be set such that the specific frequency becomes the first frequency f1 for driving the resonance-type coil unit 1410. Specifically, the capacitance value of the loss suppression capacitor Cp and the inductance value of the loss suppression inductor Lp, which satisfy Equation 5 below, may be set such that the loss suppression capacitor Cp and the loss suppression inductor Lp of the loss suppression unit 1430 are connected in series and perform serial resonance at the first frequency f1 to operate as an equivalent short circuit.

$$\frac{1}{2\pi\sqrt{L_p C_p}} = \text{first resonance frequency} \quad [\text{Equation 5}]$$

For example, when the first frequency f1 is 6.78 MHz and the inductance of the loss suppression inductor Lp is 5.516 uH, the capacitance of the loss suppression capacitor Cp may be 0.1 nF. Accordingly, the impedance of the loss suppression unit 1430 may satisfy Equation 6 below. Therefore, the loss suppression unit 1430 performs serial resonance at 6.78 MHz to obtain the effect that the conducting wire is connected to both ends of the induction-type coil unit 1420, and the real part of the input impedance Zin can be removed according to Equation 4 described above. Thus, when the wireless power transfer system-charger 1000 transmits wireless power in the electromagnetic resonance scheme, power loss in the induction-type coil unit 1420 can be minimized.

$$L_p C_p = \frac{1}{(2\pi f)^2} = \frac{1}{(2\pi S 6.78 s 10^6)^2} = 5.516 s 10^{-16} \quad [\text{Equation 6}]$$

According to the embodiment of the present invention, the resistance (real part) component in the impedance of the input terminal of the resonance-type coil unit 1410 is minimized and the power loss is minimized by the interference of the resonance-type coil unit 1410 and the induction-type coil unit 1420. The power transfer using the magnetic induction scheme and the power transfer using the electromagnetic resonance scheme may be independently operated.

In addition, since the loss suppression capacitor Cp and the loss suppression inductor Lp are connected in series to both ends of the induction-type coil unit 1420 and operate at the first frequency f1 of 6.78 MHz, the impedance looking from the resonance-type coil unit 1410 has no real component and has only an imaginary component. Thus, it is possible to prevent loss generation caused by inductive coupling between the resonance-type coil unit 1410 and the induction-type coil unit 1420. In addition, due to the series connection of the loss suppression capacitor Cp and the loss suppression inductor Lp, it is necessary to minimize the influence of the loss suppression unit 1430 when the wireless power transfer system-charger 1000 operates in the magnetic induction scheme. Specifically, as can be seen from FIG. 10, the series connection of the loss suppression capacitor Cp and the loss suppression inductor Lp becomes high impedance at the second frequency (for example, 200 kHz) f2 at which the wireless power transfer system-charger 1000 operates in the magnetic induction scheme, thereby obtaining the same effect as the connection of the open circuit to both ends of the induction-type coil unit 1420. Therefore, the influence of the loss suppression unit 1430 when the wireless power transfer system-charger 1000 operates in the magnetic induction scheme is very small. For example, when a 5.516-uH inductor and a 0.1-nF capacitor are respectively used as the loss suppression inductor Lp and the loss suppression capacitor Cp, the impedance value of the loss suppression unit 1430 at the first frequency (for example, 200 kHz) f1 is a very large value, as shown in Equation 7.

$$Zs = j2\pi f L_s + \frac{1}{j2\pi f C_s} = j6.93 - j7961.78 = -j7954.85 \quad [\text{Equation 7}]$$

A range of the product of the loss suppression capacitor Cp and the loss suppression inductor Lp may be determined. The values of the loss suppression capacitor Cp and the loss suppression inductor Lp need not accurately match the values derived from Equation 7. Even when the values of the loss suppression capacitor Cp and the loss suppression inductor Lp have values close to the values derived from Equation 7, the loss suppression unit 1430, which is the serial-connection circuit of the loss suppression capacitor Cp and the loss suppression inductor Lp, has a small impedance. Accordingly, the resistance component of the input impedance Zin may be minimized, thereby obtaining the effect that can reduce power loss generated by inductive coupling between the resonance-type coil unit 1410 and the induction-type coil unit 1420 mounted on the single coil printed circuit board 3100 and adjacent to each other.

Meanwhile, the loss suppression unit 1430 may include a variable capacitor and a variable inductor. A capacitance of the variable capacitor and an inductance of the variable inductor may be varied under the control of the transmission-side communication and control unit 1500. For example, if the first frequency is varied when the first DC/AC conversion unit 1210 is driven to transfer the AC signal having the first frequency to the resonance-type coil unit 1410, the transmission-side communication and control unit 1500 changes at least one of the capacitance of the variable capacitor and the inductance of the variable inductor so that the loss suppression unit 1430 performs serial resonance at the varied frequency. Accordingly, it is possible to minimize power loss caused by inductive coupling between the resonance-type coil unit 1410 and the induction-type coil unit 1420.

Figure 11:
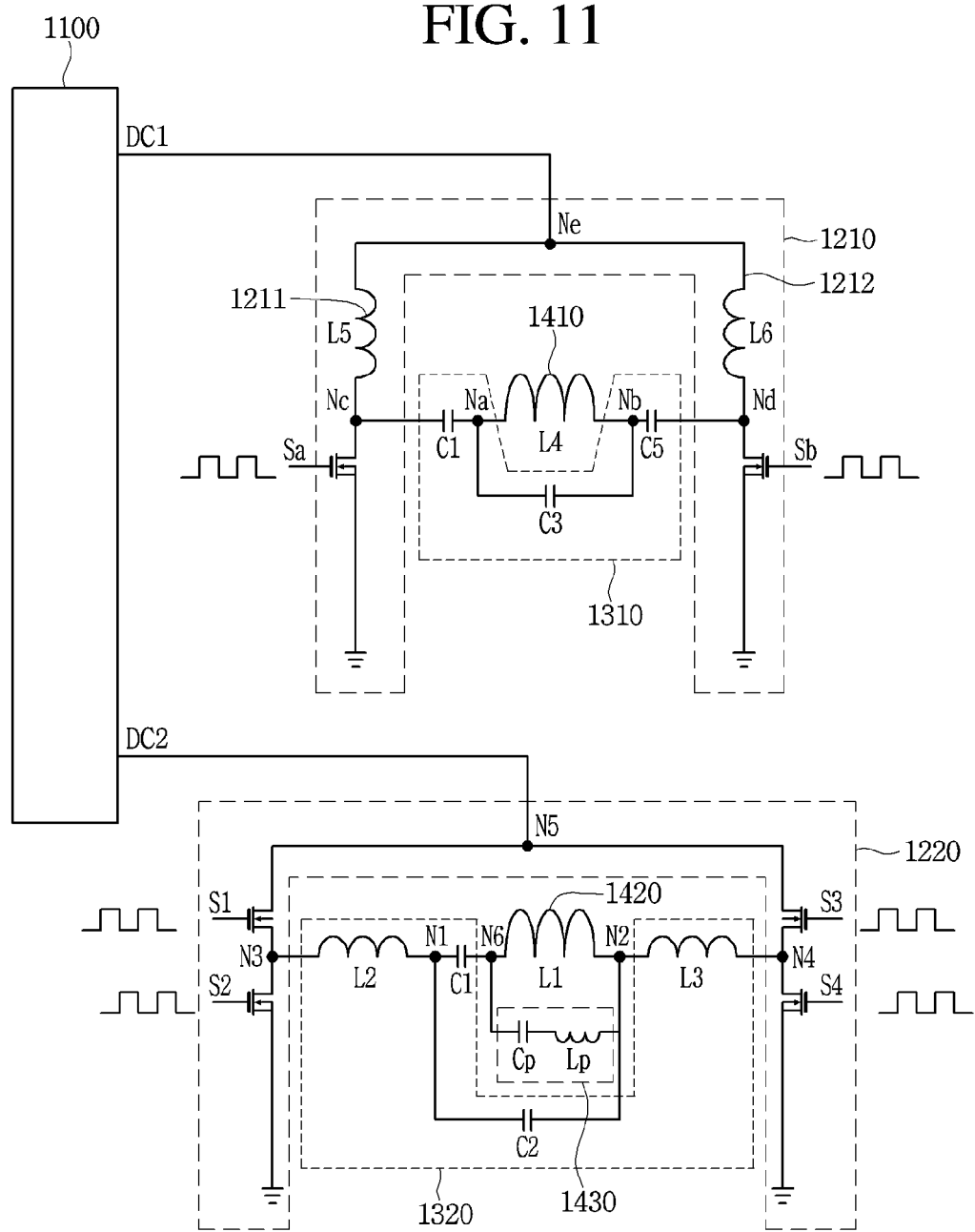
FIG. 11 is a view illustrating first and second transmission-side DC/AC conversion units, first and second transmission-side impedance matching units, and first and second transmission-side coil units in a wireless power transfer system-charger according to an embodiment of the present invention.

FIG. 11 is a view illustrating the first and second transmission-side DC/AC conversion units, the first and second transmission-side impedance matching units, and the first and second transmission-side coil units in the wireless power transfer system-charger according to an embodiment of the present invention.

Referring to FIG. 11, the first transmission-side DC/AC conversion unit 1210 may receive a first DC signal DC1 from the AC/DC conversion unit 1100 through a fifth node Ne and output an AC signal to third and fourth nodes Nc and Nd. Due to the AC signals of the third and fourth nodes Nc and Nd, current flows through the first transmission-side coil unit 1410, and power is transferred to the reception-side coil unit 2100 of the wireless power receiver system-device 2000 by the medium of a magnetic flux generated by the flowing current.

The first transmission-side DC/AC conversion unit 1210 may include first and second switches Sa and Sb and first and second high-frequency filter units 1211 and 1212. The first high-frequency filter unit 1211 may be connected between the third node Nc and the fifth node Ne, and the second high-frequency filter unit 1212 may be connected between the fourth node Nd and the fifth node Ne. The first switch Sa may be connected between the third node Nc and a reference ground, and the second switch Sb may be connected between the fourth node Nd and the reference ground.

Pulse width modulation signals may be supplied to the first and second switches Sa and Sb so that the first and second switches Sa and Sb are alternately conducted. The first and second switches Sa and Sb may be operated at the first frequency by the transmission-side communication and control unit 1500. The first and second high-frequency filter units 1211 and 1212 may attenuate a high-frequency signal included in the DC signal DC1 provided from the fifth node Ne. Each of the first and second high-frequency filter units 1211 and 1212 may include at least one choke coil RFC.

The first transmission-side impedance matching unit 1310 may include third to fifth capacitors C3, C4, and C5. The third capacitor C3 may be connected between the first node Na and the third node Nc, the fourth capacitor C4 may be connected between the first node Na and the second node Nb, and the fifth capacitor C5 may be connected between the second node Nb and the fourth node Nd.

The first transmission-side coil unit 1410 is a resonance-type coil unit and may be connected between the first node Na and the second node Nb.

In addition, the loss suppression unit 1430 may be connected between both ends of the first transmission-side coil unit 1410, that is, the first node Na and the second node Nb.

The second transmission-side DC/AC conversion unit 1220 may receive a second DC signal DC2 from the AC/DC conversion unit 1100 through a fifth node N5 and output an AC signal to third and fourth nodes N3 and N4. Due to the AC signals of the third and fourth nodes N3 and N4, current flows through the second transmission-side coil unit 1420, and power is transferred to the reception-side coil unit 2100 of the wireless power receiver system-device 2000 by the medium of a magnetic flux generated by the flowing current.

The second transmission-side DC/AC conversion unit 1220 may include first to fourth switches S1, S2, S3, and S4. The first switch S1 may be connected between the third node N3 and the fifth node N5, the second switch S2 may be connected between the third node N3 and the reference ground, the third switch S3 may be connected between the fourth node N4 and the fifth node N5, and the fourth switch S4 may be connected between the fourth node N4 and the reference ground.

The first and fourth switches S1 and S4 may switch with the same phase, the second and third switches S2 and S3 may switch with the same phase, and the first and second switches S1 and S2 may switch with different phases. The switches may be operated at the second frequency by the transmission-side communication and control unit 1500.

The second transmission-side impedance matching unit 1320 may include a second inductor L2 connected between the first node N1 and the third node N3, a third inductor L3 connected between the second node N2 and the fourth node N4, a first capacitor C1 connected between the first node N1 and the sixth node N6, and a second capacitor C2 connected between the first node N1 and the second node N2.

The second transmission-side coil unit 1420 is an induction-type coil unit and may be connected between the first node N1 and the second node N2.

Figure 12:
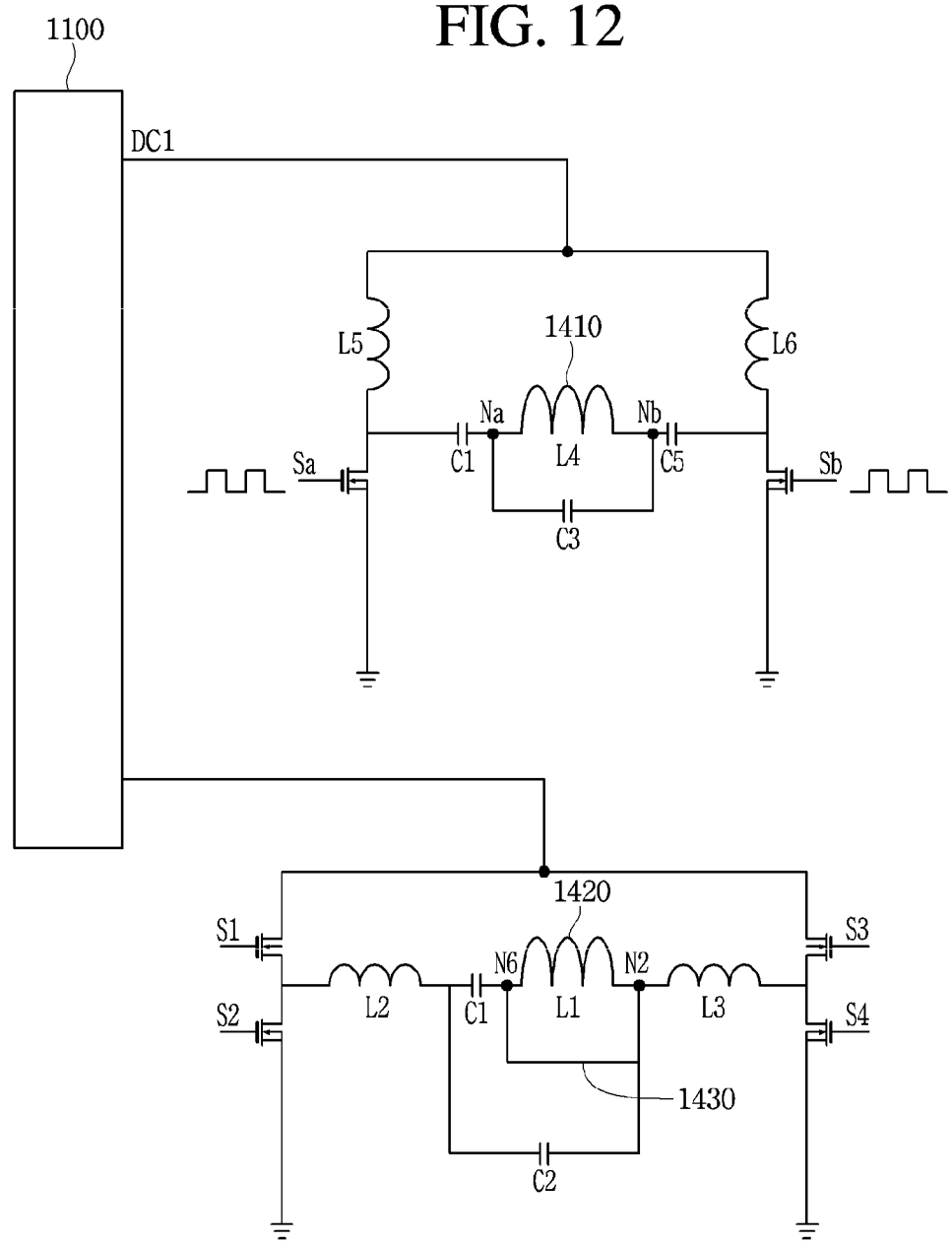
FIG. 12 is a view illustrating an equivalent circuit when a wireless power transfer system-charger according to an embodiment of the present invention supplies power at a first frequency in an electromagnetic resonance scheme.

FIG. 12 is a view illustrating an equivalent circuit when the wireless power transfer system-charger according to an embodiment of the present invention supplies power at the first frequency in the electromagnetic resonance scheme.

Referring to FIG. 12, when the wireless power transfer system-charger 1000 supplies power in the electromagnetic resonance scheme, the first DC signal DC1 may be supplied to the first transmission-side DC/AC conversion unit 1210, and the supply of the second DC signal DC2 to the second transmission-side DC/AC conversion unit 1220 may be interrupted. Due to the transmission-side communication and control unit 1500, the first and second switches Sa and Sb of the first transmission-side DC/AC conversion unit 1210 are operated with the first frequency, and the loss suppression unit 1430 operates as a short circuit when the serial resonance frequency of the loss suppression unit 1430 is the first frequency or a frequency close to the first frequency. Accordingly, the loss suppression unit 1430 provides the effect that a conducting wire is connected in parallel to the induction-type coil unit 1420 connected between the sixth node N6 and the second node N2, so that the resistance component is minimized in the input impedance Zin looking from the resonance-type coil unit 1410 into the induction-type coil unit 1420. Thus, it is possible to minimize power loss generated while the magnetic flux generated in the resonance-type coil unit 1410 is interlinked with the induction-type coil unit 1420.

Figure 13:
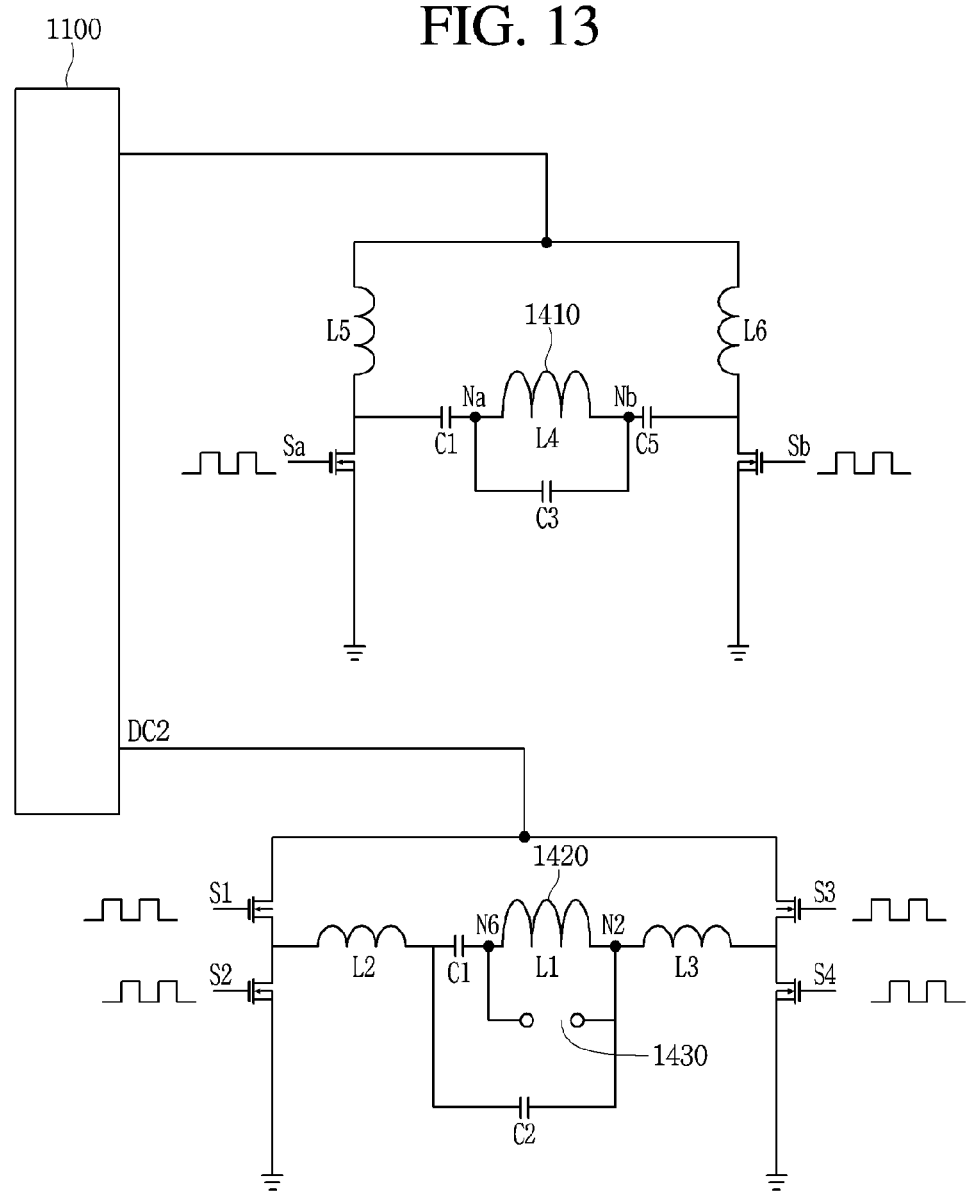
FIG. 13 is a view illustrating an equivalent circuit when a wireless power transfer system-charger according to an embodiment of the present invention supplies power at a second frequency in a magnetic induction scheme.

FIG. 13 is a view illustrating an equivalent circuit when the wireless power transfer system-charger according to an embodiment of the present invention supplies power at the second frequency in the magnetic induction scheme.

Referring to FIG. 13, when the wireless power transfer system-charger 1000 supplies power in the magnetic induction scheme, the supply of the first DC signal DC1 to the first transmission-side DC/AC conversion unit 1210 may be interrupted, and the second DC signal DC2 may be supplied to the second transmission-side DC/AC conversion unit 1220. Due to the transmission-side communication and control unit 1500, the first to fourth switches S1 to S4 of the second transmission-side DC/AC conversion unit 1220 are operated with the second frequency, and the loss suppression unit 1430 has high impedance at the second frequency and thus operates as an open circuit. Therefore, it is possible to minimize the influence on the operation of the wireless power transfer system-charger 1000 when wireless power transfer system-charger 1000 transfers power in the magnetic induction scheme.

<Transmission-Side Coil Unit According to Second Embodiment>

Figure 14:
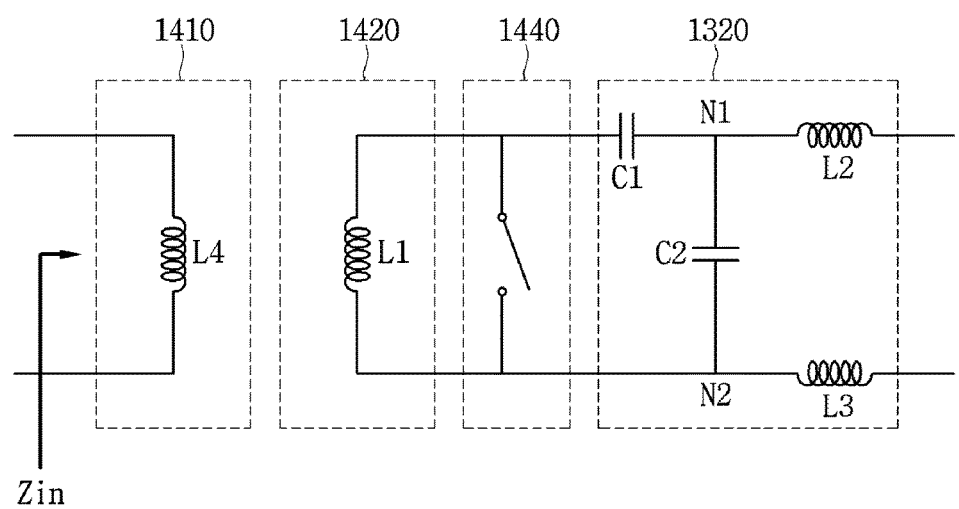
FIG. 14 is an equivalent circuit diagram of a transmission-side coil unit according to a second embodiment.

FIG. 14 is an equivalent circuit diagram of a transmission-side coil unit according to a second embodiment.

Referring to FIGS. 8 and 14, the transmission-side coil unit 1400 according to the second embodiment of the present invention may include a resonance-type coil unit 1410, an induction-type coil unit 1420, and a switch unit 1440.

The switch unit 1440 may be connected between the induction-type coil unit 1420 and the second impedance matching unit 1320. Specifically, the switch unit 1440 may be connected in parallel to the induction-type coil unit 1420 and connected in parallel to the second impedance matching unit 1320.

When an AC signal of a first driving frequency is supplied to the resonance-type coil unit 1410, the switch unit 1440 may short-circuit both ends of the induction-type coil unit 1420. In other words, the switch unit 1440 may make both ends of the induction-type coil unit 1420 be 0 V.

When each element is expressed as an equivalent circuit, the induction-type coil unit 1420 may be expressed as a first inductor L1, the second impedance matching unit 1320 may expressed as a first capacitor C1 having one end connected to one end of the induction-type coil unit 1420 and the other end connected to a first node N1, a second capacitor C2 having one end connected to the first node N1 and the other end connected to a second node N2, a second inductor L2 having one end connected to the first node N1 and the other end connected to one end of the second DC/AC conversion unit 1220, and a third inductor having one end connected to the second node N2 and the other end connected to the other end of the second DC/AC conversion unit 1220, and the resonance-type coil unit 1410 may be expressed as a fourth inductor L4.

The switch unit 1440 may include a switch element that may be driven according to a switching control signal from the transmission-side communication and control unit 1500.

The switch element may be connected to both ends of the first inductor L1. That is, the switch element may be connected in parallel to the first inductor L1. In other words, the switch element may be connected between one end of the first capacitor C1 and the second node N2.

Hereinafter, the function of the switch unit 1440 will be described in detail.

In a state in which the switch unit 1440 is not connected, when the signal of the first frequency f1 is applied to the resonance-type coil unit 1410, an input impedance Zin looking from the resonance-type coil unit 1410 into the induction-type coil unit 1420, that is, an input impedance Zin looking from the fourth inductor L4 into the induction-type coil unit 1420, may satisfy Equation 3 above.

It can be seen that a real part of the input impedance Zin is present in Equation 3, and the real part may cause power loss.

In a state in which the switch unit 1440 is connected, when the signal of the first frequency f1 is applied to the resonance-type coil unit 1410 and the switch unit 1440 is in a closed state, an input impedance Zin looking from the resonance-type coil unit 1410 into the induction-type coil unit 1420, that is, an input impedance Zin looking from the fourth inductor L4 into the induction-type coil unit 1420, may satisfy Equation 4 above.

It can be seen from Equation 4 that the real part is absent in the input impedance Zin. Due to the absence of the real part, when the resonance-type coil unit 1410 is driven at the first frequency f1, power loss in the induction-type coil unit 1420 is ideally zero, and in practice, power loss is minimized.

Figure 15:
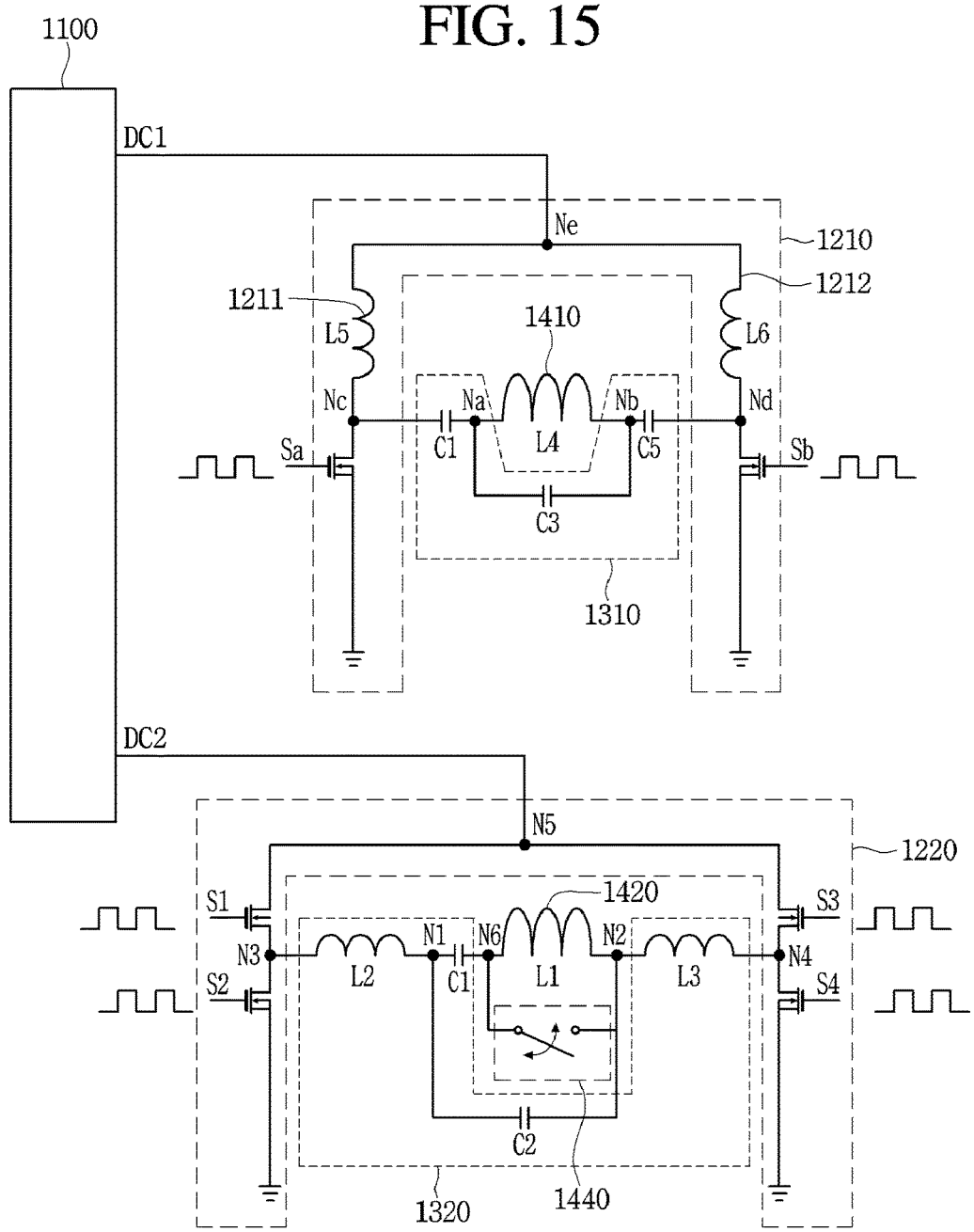
FIG. 15 is a view illustrating the first and second transmission-side DC/AC conversion units, the first and second transmission-side impedance matching units, and the first and second transmission-side coil units in the wireless power transfer system-charger according to an embodiment of the present invention.

FIG. 15 is a view illustrating the first and second transmission-side DC/AC conversion units, the first and second transmission-side impedance matching units, and the first and second transmission-side coil units in the wireless power transfer system-charger according to an embodiment of the present invention.

Referring to FIG. 15, the first transmission-side DC/AC conversion unit 1210 may receive a first DC signal DC1 from the AC/DC conversion unit 1100 through a fifth node Ne and output an AC signal to third and fourth nodes Nc and Nd. Due to the AC signals of the third and fourth nodes Nc and Nd, current flows through the first transmission-side coil unit 1410, and power is transferred to the reception-side coil unit 2100 of the wireless power receiver system-device 2000 by the medium of a magnetic flux generated by the flowing current.

The first transmission-side DC/AC conversion unit 1210 may include first and second switches Sa and Sb and first and second high-frequency filter units 1211 and 1212. The first high-frequency filter unit 1211 may be connected between the third node Nc and the fifth node Ne, and the second high-frequency filter unit 1212 may be connected between the fourth node Nd and the fifth node Ne. The first switch Sa may be connected between the third node Nc and a reference ground, and the second switch Sb may be connected between the fourth node Nd and the reference ground.

Pulse width modulation signals may be applied to the first and second switches Sa and Sb so that the first and second switches Sa and Sb are alternately conducted. The first and second switches Sa and Sb may be operated at the first frequency by the transmission-side communication and control unit 1500. The first and second high-frequency filter units 1211 and 1212 may attenuate a high-frequency signal included in the DC signal DC1 provided from the fifth node Ne. Each of the first and second high-frequency filter units 1211 and 1212 may include at least one choke coil RFC.

The first transmission-side impedance matching unit 1310 may include third to fifth capacitors C3, C4, and C5. The third capacitor C3 may be connected between the first node Na and the third node Nc, the fourth capacitor C4 may be connected between the first node Na and the second node Nb, and the fifth capacitor C5 may be connected between the second node Na and the fourth node Nd.

The first transmission-side coil unit 1410 is a resonance-type coil unit and may be connected between the first node Na and the second node Nb.

In addition, the switch unit 1440 may be connected between both ends of the first transmission-side coil unit 1410, that is, the first node Na and the second node Nb.

The second transmission-side DC/AC conversion unit 1220 may receive a second DC signal DC2 from the AC/DC conversion unit 1100 through a fifth node N5 and output an AC signal to third and fourth nodes N3 and N4. Due to the AC signals of the third and fourth nodes N3 and N4, current flows through the second transmission-side coil unit 1420, and power is transferred to the reception-side coil unit 2100 of the wireless power receiver system-device 2000 by the medium of a magnetic flux generated by the flowing current.

The second transmission-side DC/AC conversion unit 1220 may include first to fourth switches S1, S2, S3, and S4. The first switch S1 may be connected between the third node N3 and the fifth node N5, the second switch S2 may be connected between the third node N3 and the reference ground, the third switch S3 may be connected between the fourth node N4 and the fifth node N5, and the fourth switch S4 may be connected between the fourth node N4 and the reference ground.

The first and fourth switches S1 and S4 may switch with the same phase, the second and third switches S2 and S3 may switch with the same phase, and the first and second switches S1 and S2 may switch with different phases. The switches may be operated at the second frequency by the transmission-side communication and control unit 1500.

The second transmission-side impedance matching unit 1320 may include a second inductor L2 connected between the first node N1 and the third node N3, a third inductor L3 connected between the second node N2 and the fourth node N4, a first capacitor C1 connected between the first node N1 and the sixth node N6, and a second capacitor C2 connected between the first node N1 and the second node N2.

The second transmission-side coil unit 1420 is an induction-type coil unit and may be connected between the first node N1 and the second node N2.

Figure 16:
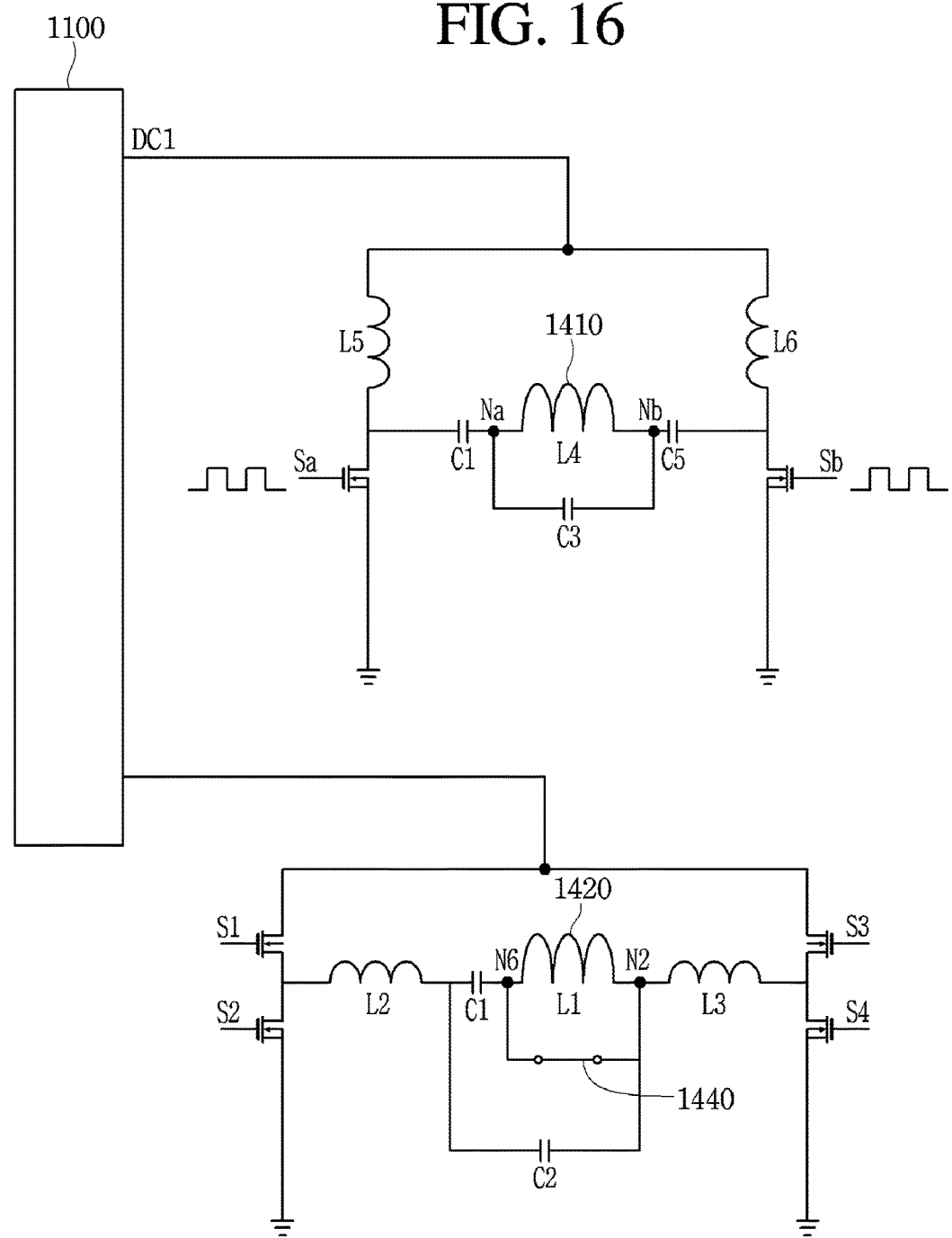
FIG. 16 is a view illustrating an equivalent circuit when the wireless power transfer system-charger according to an embodiment of the present invention supplies power at the first frequency in the electromagnetic resonance scheme.

FIG. 16 is a view illustrating an equivalent circuit when the wireless power transfer system-charger according to an embodiment of the present invention supplies power at the first frequency in the electromagnetic resonance scheme.

Referring to FIG. 16, when the wireless power transfer system-charger 1000 supplies power in the electromagnetic resonance scheme, the first DC signal DC1 may be supplied to the first transmission-side DC/AC conversion unit 1210, and the supply of the second DC signal DC2 to the second transmission-side DC/AC conversion unit 1220 may be interrupted. The switch unit 1440 may be closed. Accordingly, the switch unit 1440 provides the effect that a conducting wire is connected in parallel to the induction-type coil unit 1420 connected between the sixth node N6 and the second node N2, so that the resistance component is minimized in the input impedance Zin looking from the resonance-type coil unit 1410 into the induction-type coil unit 1420. Thus, it is possible to minimize power loss generated while the magnetic flux generated in the resonance-type coil unit 1410 is interlinked with the induction-type coil unit 1420.

FIG. 17 is a view illustrating an equivalent circuit when the wireless power transfer system-charger according to an embodiment of the present invention supplies power at the second frequency in the magnetic induction scheme.

Referring to FIG. 17, when the wireless power transfer system-charger 1000 supplies power in the magnetic induction scheme, the supply of the first DC signal DC1 to the first transmission-side DC/AC conversion unit 1210 may be interrupted, and the second DC signal DC2 may be supplied to the second transmission-side DC/AC conversion unit 1220. The switch unit 1440 may be opened. Therefore, the switch unit 1440 operates as an open circuit, and thus, it is possible to minimize the influence on the operation of the wireless power transfer system-charger 1000 when wireless power transfer system-charger 1000 transfers power in the magnetic induction scheme. As described above, according to the first and second embodiments of the present invention, in the case of the wireless power transfer system-charger 1000 that can transfer wireless power according to the electromagnetic resonance scheme and the magnetic induction scheme in a composite manner, since both the resonance-type coil unit 1410 and the induction-type coil unit 1420 are mounted on the single coil printed circuit board 3100, loss may be generated by mutual interference between the resonance-type coil unit 1410 and the induction-type coil unit 1420. In general, an amount of loss when a magnetic field generated in the induction-type coil unit 1420 is linked to the resonance-type coil unit 1410 is very small, but an amount of loss when a magnetic field generated in the resonance-type coil unit 1410 is linked to the induction-type coil unit 1420 is very large. In this regard, power loss may be minimized by removing a real part from a reflection impedance appearing in the input impedance Zin looking from the resonance-type coil unit 1410 into the induction-type coil unit 1420 through the loss suppression unit 1430 or the switch unit 1440.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The present invention is applicable to wireless charging fields that can wirelessly transfer power.

The invention claimed is:

1. A wireless power transmission apparatus comprising:
a resonance-type coil unit;
an induction-type coil unit; and
a loss suppression unit comprising a serial resonant circuit connected to both ends of the induction-type coil unit, wherein the loss suppression unit resonates at a first frequency for driving the resonance-type coil unit.

2. The wireless power transmission apparatus of claim 1, wherein the serial resonant circuit comprises at least one capacitor and at least one inductor.

3. The wireless power transmission apparatus of claim 1, wherein the loss suppression unit has an impedance magnitude equal to or greater than an impedance magnitude preset at a second frequency for driving the induction-type coil unit.

4. The wireless power transmission apparatus of claim 3, further comprising:

a first DC/AC conversion unit configured to convert a first DC signal and transfer an AC signal having the first frequency to the resonance-type coil unit; and a second DC/AC conversion unit configured to convert a second DC signal and transfer an AC signal having the second frequency to the induction-type coil unit.

5. The wireless power transmission apparatus of claim 4, further comprising a control unit configured to control operations of the first and second DC/AC conversion units, wherein the control unit enables the first DC/AC conversion unit and disables the second DC/AC conversion unit so that the first DC/AC conversion unit is controlled to transfer the AC signal having the first frequency to the resonance-type coil unit, and enables the second DC/AC conversion unit and disables the first DC/AC conversion unit so that the second DC/AC conversion unit is controlled to transfer the AC signal having the second frequency to the induction-type coil unit.

6. The wireless power transmission apparatus of claim 4, further comprising an AC/DC conversion unit configured to receive an AC signal and supply the first and second DC signals to the first and second DC/AC conversion units, wherein the first DC/AC conversion unit comprises:
a first high-frequency filter unit connected between the AC/DC conversion unit and a first node;
a second high-frequency filter unit connected between the AC/DC conversion unit and a second node;
a first switch connected between the first node and a third node; and
a second switch connected between the second node and the third node,
wherein the resonance-type coil unit is connected between the first node and the second node.

7. The wireless power transmission apparatus of claim 4, further comprising an AC/DC conversion unit configured to receive an AC signal and supply the first and second DC signals to the first and second DC/AC conversion units, wherein the second DC/AC conversion unit comprises:
a first switch connected between the AC/DC conversion unit and a first node;
a second switch connected between the first node and a third node;
a third switch connected between the AC/DC conversion unit and a second node; and
a fourth switch connected between the second node and the third node,
wherein the induction-type coil unit is connected between the first node and the second node.

8. The wireless power transmission apparatus of claim 3, wherein the first frequency is about 6.78 MHz, and the second frequency is about 125 KHz.

9. The wireless power transmission apparatus of claim 1, wherein the loss suppression unit comprises a variable capacitor and a variable inductor connected in series to each other.

10. The wireless power transmission apparatus of claim 9, wherein, when the first frequency is varied, at least one of a capacitance of the variable capacitor and an inductance of the variable inductor is varied.

11. A wireless power transmission apparatus comprising:
a resonance-type coil unit;
an induction-type coil unit; and
a switch element connected to both ends of the induction-type coil unit, wherein the switch element is turned on or off when power is transmitted by either of the resonance-type coil unit or the induction-type coil unit.

12. The wireless power transmission apparatus of claim 11, wherein the switch element is turned on when power is transmitted by the resonance-type coil unit.

13. The wireless power transmission apparatus of claim 11, wherein the switch element is turned off when power is transmitted by the induction-type coil unit.

14. The wireless power transmission apparatus of claim 13, further comprising:
a first DC/AC conversion unit configured to convert a first DC signal and transfer an AC signal having a first frequency to the resonance-type coil unit; and
a second DC/AC conversion unit configured to convert a second DC signal and transfer an AC signal having a second frequency to the induction-type coil unit.

15. The wireless power transmission apparatus of claim 14, further comprising a control unit configured to control operations of the first and second DC/AC conversion units and an operation of the switch element, wherein the control unit enables the first DC/AC conversion unit and disables the second DC/AC conversion unit so that the first DC/AC conversion unit is controlled to transfer the AC signal having the first frequency to the resonance-type coil unit, and
the control unit turns on the switch element.

16. The wireless power transmission apparatus of claim 14, further comprising a control unit configured to control operations of the first and second DC/AC conversion units, wherein the control unit enables the second DC/AC conversion unit and disables the first DC/AC conversion unit so that the second DC/AC conversion unit is controlled to transfer the AC signal having the second frequency to the induction-type coil unit, and
the control unit turns off the switch element.

17. The wireless power transmission apparatus of claim 14, further comprising an AC/DC conversion unit configured to receive an AC signal and supply the first and second DC signals to the first and second DC/AC conversion units, wherein the first DC/AC conversion unit comprises:
a first high-frequency filter unit connected between the AC/DC conversion unit and a first node;
a second high-frequency filter unit connected between the AC/DC conversion unit and a second node;
a first switch connected between the first node and a third node; and
a second switch connected between the second node and the third node,
wherein the resonance-type coil unit is connected between the first node and the second node.

18. The wireless power transmission apparatus of claim 14, further comprising an AC/DC conversion unit configured to receive an AC signal and supply the first and second DC signals to the first and second DC/AC conversion units, wherein the second DC/AC conversion unit comprises:
a first switch connected between the AC/DC conversion unit and a first node;
a second switch connected between the first node and a third node;
a third switch connected between the AC/DC conversion unit and a second node; and
a fourth switch connected between the second node and the third node,
wherein the induction-type coil unit is connected between the first node and the second node.

19. The wireless power transmission apparatus of claim 11, wherein, when the resonance-type coil unit is driven, an AC signal having a frequency of about 6.78 MHz is supplied to the resonance-type coil unit.

20. The wireless power transmission apparatus of claim 11, wherein, when the induction-type coil unit is driven, an AC signal having a frequency of about 125 KHz is supplied to the induction-type coil unit.

* * * * *